(12) United States Patent
Mok et al.

(10) Patent No.: US 11,140,733 B2
(45) Date of Patent: Oct. 5, 2021

(54) METHOD AND DEVICE FOR ALLOWING PEDESTRIAN TERMINAL TO TRANSMIT DATA IN V2X COMMUNICATION

(71) Applicant: Samsung Electronics Co., Ltd., Suwon-si (KR)

(72) Inventors: Youngjoong Mok, Hwaseong-si (KR); Hyunjeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/638,131

(22) PCT Filed: Aug. 8, 2018

(86) PCT No.: PCT/KR2018/009013
§ 371 (c)(1),
(2) Date: Feb. 10, 2020

(87) PCT Pub. No.: WO2019/031837
PCT Pub. Date: Feb. 14, 2019

(65) Prior Publication Data
US 2020/0245389 A1 Jul. 30, 2020

(30) Foreign Application Priority Data
Aug. 10, 2017 (KR) .................. 10-2017-0101957

(51) Int. Cl.
*H04W 76/15* (2018.01)
*H04W 72/04* (2009.01)
*H04W 4/40* (2018.01)

(52) U.S. Cl.
CPC ............ *H04W 76/15* (2018.02); *H04W 4/40* (2018.02); *H04W 72/042* (2013.01); *H04W 72/048* (2013.01)

(58) Field of Classification Search
CPC ..... H04W 28/02; H04W 72/12; H04W 76/27; H04W 72/04; H04W 76/28;
(Continued)

(56) References Cited

U.S. PATENT DOCUMENTS 8,462,688 B1  6/2013  Dinan
10,034,308 B2 7/2018 Lee et al.
(Continued)

FOREIGN PATENT DOCUMENTS

KR  10-2016-0089354 A   7/2016
KR  10-2016-0132368 A  11/2016

OTHER PUBLICATIONS

International Search Report dated Nov. 13, 2018 in connection with International Patent Application No. PCT/KR2018/009013, 5 pages.
(Continued)

*Primary Examiner* — Khawar Iqbal

(57) ABSTRACT

Disclosed are a communication technique for merging IoT technology with a 5G communication system for supporting a data transmission rate higher than that of a 4G system and a system thereof. The present disclosure can be applied to intelligent services (for example, smart home, smart building, smart city, smart, car or connected car, healthcare, digital education, retail, security, and safety related services, and the like) on the basis of 5G communication technology and IoT-related technology. A communication method and device in a V2X communication system are disclosed.

11 Claims, 22 Drawing Sheets

(58) Field of Classification Search
CPC ......... H04W 72/1263; H04W 72/1289; H04W 72/1257; H04W 36/38; H04W 36/08; H04W 4/70; H04W 72/1242; H04W 4/46; H04W 36/0033; H04W 76/14; H04L 1/00; H04L 1/18

See application file for complete search history.

(56) References Cited

U.S. PATENT DOCUMENTS

| | | | |
|---|---|---|---|
| 10,075,279 | B2 | 9/2018 | Yang et al. |
| 10,721,025 | B2* | 7/2020 | Jeon ..................... H04L 5/0053 |
| 2013/0329651 | A1 | 12/2013 | Lee et al. |
| 2015/0334769 | A1 | 11/2015 | Kim et al. |
| 2016/0135095 | A1* | 5/2016 | Wu ................... H04W 36/0061 370/328 |
| 2017/0019887 | A1 | 1/2017 | Jiang et al. |
| 2018/0042043 | A1* | 2/2018 | Babaei ................. H04L 5/0082 |
| 2018/0049073 | A1* | 2/2018 | Dinan ............... H04W 72/0413 |
| 2018/0124648 | A1* | 5/2018 | Park .................. H04W 36/0005 |
| 2018/0139734 | A1* | 5/2018 | Babaei ............. H04W 72/0406 |
| 2019/0199666 | A1* | 6/2019 | Pattan ..................... H04L 67/14 |
| 2019/0229964 | A1* | 7/2019 | Ouchi ................ H04L 27/2613 |
| 2020/0068595 | A1* | 2/2020 | Dinan ............... H04W 72/1257 |
| 2020/0245389 | A1* | 7/2020 | Mok ................... H04W 72/048 |
| 2021/0105088 | A1* | 4/2021 | Shimezawa ........... H04W 72/04 |
| 2021/0105801 | A1* | 4/2021 | Shimezawa ....... H04W 72/1263 |
| 2021/0160950 | A9* | 5/2021 | Fujishiro ............... H04W 72/02 |
| 2021/0211996 | A1* | 7/2021 | Lin ..................... H04W 52/365 |
| 2021/0235478 | A1* | 7/2021 | Karaki ............. H04W 72/0413 |

OTHER PUBLICATIONS

Written Opinion of the International Searching Authority dated Nov. 13, 2018 in connection with International Patent Application No. PCT/KR2018/009013, 6 pages.

* cited by examiner

FIG. 4

| Zone Type | Zone IDs |
|---|---|
| Enable Zone List | Zone 1~5 |
| Disable Zone List | Zone 10<br>Zone 11 |

FIG. 5

| | Data Transmission Period | Tx Power | HARQ | MAX Retransmission | Resource Selection |
|---|---|---|---|---|---|
| Zone ID 1 | 100ms | x dB | 8 | 1 | Partial |
| Zone ID 2 | 1000ms | y dB | 16 | 2 | Random |
| ...... | | | | | |

FIG. 6

| | Zone IDs | Data Transmission Period | Tx Power | HARQ | MAX Retransmission | Resource Selection |
|---|---|---|---|---|---|---|
| Enable Zone List | Zone 1~5 | 100ms | x dB | 8 | 1 | Partial |
| Disable Zone List | Zone 10 Zone 11 | 1000ms | y dB | 16 | 2 | Random |

METHOD AND DEVICE FOR ALLOWING PEDESTRIAN TERMINAL TO TRANSMIT DATA IN V2X COMMUNICATION

CROSS-REFERENCE TO RELATED APPLICATIONS

This application is a 371 of International Application No. PCT/KR2018/009013 filed on Aug. 8, 2018, which claims priority to Korean Patent Application No. 10-2017-0101957 filed on Aug. 10, 2017, the disclosures of which are herein incorporated by reference in their entirety.

BACKGROUND

1. Field

The disclosure relates to a method for efficiently operating a terminal communication power of a pedestrian terminal (UE) in a vehicle communication system (vehicle to everything (hereinafter referred to as "V2X") communication system).

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System."

Implementation of the 5G communication system in ultra-high frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched.

Such an IoT environment may provide intelligent Internet technology (IT) services that generate a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

Meanwhile, various attempts and researches for improvement of data transmission and reception in a V2X communication system have been made.

An embodiment of the disclosure proposes a method for providing an efficient terminal communication power operation by preventing unnecessary message transmission through determination of whether to transmit a pedestrian to everything (P2X) message being used by a pedestrian terminal (P-UE) in V2X communication.

Another embodiment of the disclosure proposes a method for flexibly operating semi-persistent scheduling (SPS) in a primary cell (PCell) and a secondary cell (SCell) if carrier aggregation is supported in V2X communication.

SUMMARY

According to an embodiment of the disclosure to solve the above-described problem, a method by a base station in a wireless communication system includes transmitting, to a terminal, a first message including information on at least one secondary cell (SCell) for the terminal; and transmitting, to the terminal, a second message including semi-persistent scheduling (SPS) configuration information for the at least one SCell, wherein the SPS configuration information includes SPS index information.

According to an embodiment of the disclosure, a method by a terminal in a wireless communication system includes receiving, from a base station, a first message including information on at least one secondary cell (SCell) for the terminal; and receiving, from the base station, a second message including semi-persistent scheduling (SPS) configuration information for the at least one SCell, wherein the SPS configuration information includes SPS index information.

According to an embodiment of the disclosure, a base station in a wireless communication system includes a transceiver; and a controller configured to control the transceiver to: transmit, to a terminal, a first message including information on at least one secondary cell (SCell) for the terminal, and transmit, to the terminal, a second message including semi-persistent scheduling (SPS) configuration information for the at least one SCell, wherein the SPS configuration information includes SPS index information.

According to an embodiment of the disclosure, a terminal in a wireless communication system includes a transceiver; and a controller configured to control the transceiver to: receive, from a base station, a first message including information on at least one secondary cell (SCell) for the terminal, and receive, from the base station, a second message including semi-persistent scheduling (SPS) configuration information for the at least one SCell, wherein the SPS configuration information includes SPS index information.

According to the embodiment of the disclosure, because unnecessary message transmission is reduced in accordance with the location of the pedestrian terminal (P-UE), communication power consumption of the pedestrian terminal can be minimized.

In the case where the terminal and the system support carrier aggregation in V2X communication, the SPS is operated in the SCell, and thus the system load of the PCell and the possibility of conflict of V2X resource usage can be reduced.

BRIEF DESCRIPTION OF THE DRAWINGS

FIG. 4 is a diagram illustrating an embodiment that can be transmitted by zone information of FIG. 3 proposed in the disclosure.

FIG. 5 is a diagram illustrating another embodiment that can be transmitted by zone information of FIG. 3 proposed in the disclosure.

FIG. 6 is a diagram illustrating an embodiment of usage methods of FIGS. 4 and 5 proposed in the disclosure.

DETAILED DESCRIPTION

Figure 1:
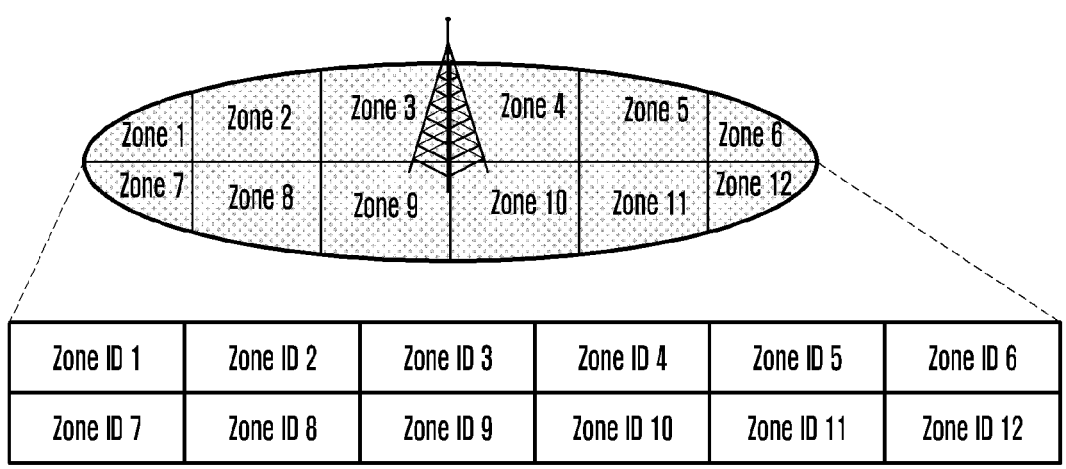
FIG. 1 is a diagram illustrating a case where resources are allocated and used using zones in an LTE system.

Hereinafter, embodiments of the disclosure will be described in detail with reference to the accompanying drawings. In describing the disclosure, detailed explanation of related well-known functions or configurations incorporated herein will be omitted in the case where it is determined that they obscure the subject matter of the disclosure in unnecessary detail. Further, terms to be described later are terms defined in consideration of their functions in the disclosure, but they may differ depending on intentions of a user and an operator or customs. Accordingly, they should be defined based on the contents of the whole description of the disclosure.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, generate means for implementing the functions specified in the flowchart block or blocks.

These computer program instructions may also be stored in a computer-usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable memory medium and configured to execute on one or more processors.

Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

FIG. 1 is a diagram illustrating a case where resources are allocated and used using zones in an LTE system. For example, in an LTE system, it is possible to operate V2X communication through division of resources into geometric zones. In order to geometrically divide the resources to be used, in an LTE system, a base station transmits SystemInformationBlock21 including zone information for V2X communication. Further, through zoneConfig-r14 included in the SystemInformationBlock21 transmitted by the base station, a terminal (UE) can calculate zone ID using its own location. A method for calculating Zone_Id is as follows.

$$Zone\_Id = y_1 * N_x + x_1$$

Here, $x_1$ is Floor (x/L) Mod $N_x$, and $y_1$ is Floor (y/W) Mod $N_y$.

Further, respective parameters are defined as follows.

L is the value of zoneLength included in zoneConfig in SystemInformationBlockType21 or in SL-V2X-Preconfiguration;

W is the value of zoneWidth included in zoneConfig in SystemInformationBlockType21 or in SL-V2X-Preconfiguration;

$N_x$ is the value of zoneIdLongiMod included in zoneConfig in SystemInformationBlockType21 or in SL-V2X-Preconfiguration;

$N_y$ is the value of zoneIdLatiMod included in zoneConfig in SystemInformationBlockType21 or in SL-V2X-Preconfiguration;

x is the distance in longitude between UE's current location and geographical coordinates (0, 0) and it is expressed in meters;

y is the distance in latitude between UE's current location and geographical coordinates (0, 0) and it is expressed in meters.

The UE can confirm usable resource information in accordance with the location using the zone ID obtained by the above-described method. For example, the UE can confirm the usable resource in accordance with the location through the zoneID-r14 in SL-CommResourcePool.

Figure 2:
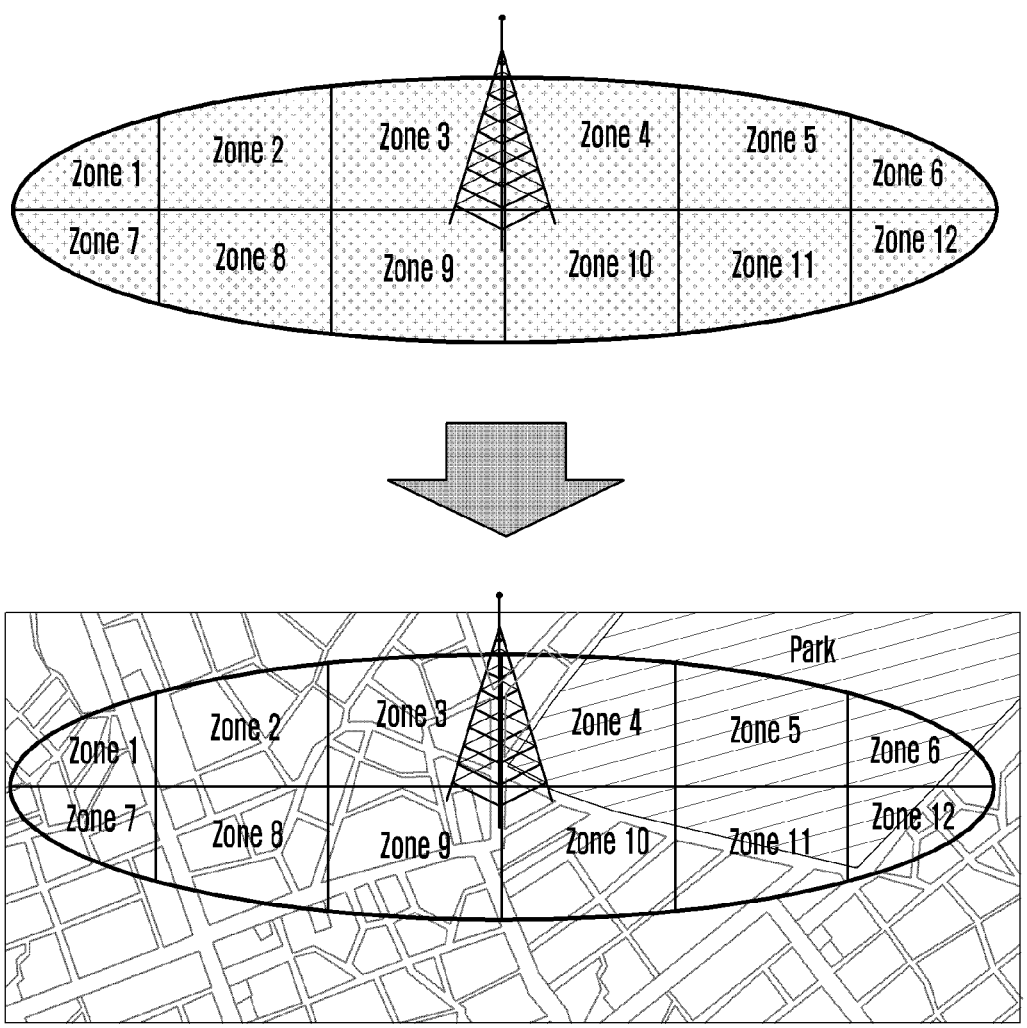
FIG. 2 is a diagram illustrating an operable embodiment in which resources are allocated using zones proposed in the disclosure.

FIG. 2 is a diagram illustrating an operable embodiment in which resources are allocated using zones proposed in the disclosure.

The base station can allocate a resource for each zone (e.g., each zone ID) through the method of FIG. 1. Further, because the base station can allocate the resource for each zone (e.g., physical location), the base station may allocate the resource with respect to the zone included in a park, such as Zone 5 of FIG. 2. The disclosure proposes a method for providing a usable Tx parameter in accordance with the zone during data transmission using the zone in the process of such an operation. A method for operating a usable Tx parameter in accordance with the zone proposed in the disclosure may be presented as following embodiments.

Embodiment 1-1 proposed in the disclosure operates enable zones and disable zones. For example, the enable (e.g., safety) zones may be Zone 1-3, Zone 9, Zone 6, Zone 10, and Zone 12 of FIG. 2, and in the enable zones, the UE can transmit P2X message. The disable (e.g., non-safety) zones may be Zone 4, Zone 5, and Zone 11 of FIG. 2, and in the disable zones, the UE stops transmission of the P2X message. In order to determine the enable zone and disable zone information, the UE location may be used, or the base station may configure and transmit the zone information.

As another embodiment, in contrast with the case of operating the enable zones and the disable zones according to embodiment 1-1 of the disclosure, it may be possible to designate and operate different transmission parameters in the enable zone and in the disable zone. For example, the UE may configure Transmission Parameter [Tx Period 100 ms, Tx Power x dB, . . . ] in the enable zone, and it may configure Transmission Parameter [Tx Period 1000 ms, Tx Power y dB, . . . ] in the disable zone.

Embodiment 1-2 proposed in the disclosure designates and operates a transmission parameter for each zone. For example, the UE may configure Transmission Parameter [Tx Period 100 ms, Tx Power x dB, . . . ] in Zone 1 of FIG. 2, and it may configure Transmission Parameter [Tx Period 1000 ms, Tx Power y dB, . . . ] in Zone 4.

Further, the transmission parameter may determine the UE location, or the base station may transmit zone information.

Figure 3:
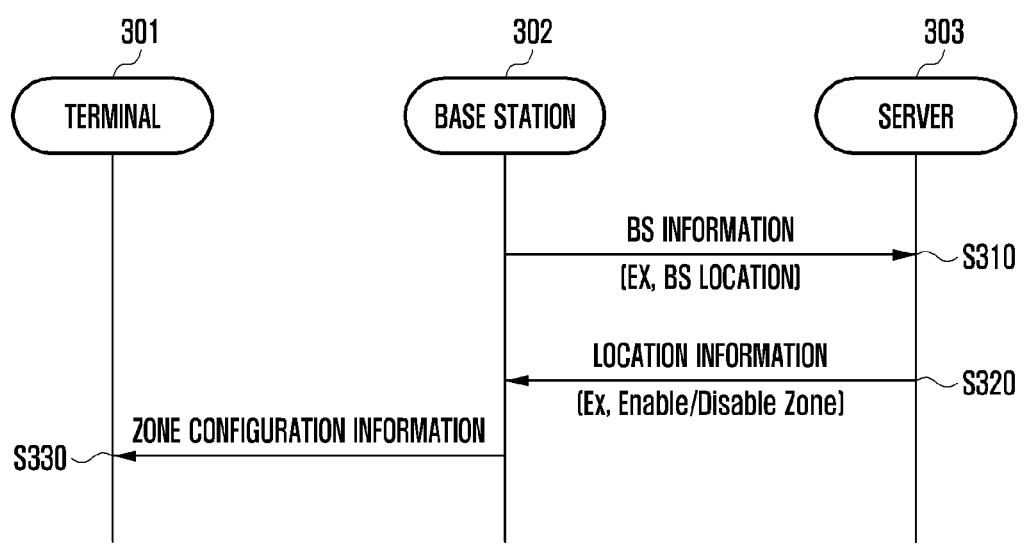
FIG. 3 is a diagram illustrating an operation for transmitting zone information proposed in the disclosure.

FIG. 3 is a diagram illustrating an operation for transmitting zone information proposed in the disclosure.

A base station (BS) 302 is a server (e.g., device managing MAP) 303, and it may transmit information (BS information) related to the location of the base station 302 (S310). The information related to the location of the base station 302 may include the location (e.g., X, Y) of the base station 302 or coverage information of the base station 302. Further, the server 303 may receive the information related to the location of the base station 302, and then it may determine neighbor enable/disable zone information based on the corresponding information.

The enable zone proposed in the disclosure is defined as follows. As an example, the enable zone may be a zone in which a pedestrian UE (P-UE) should transmit a P2X message or a zone in which the pedestrian UE (P-UE) preferentially transmits the P2X message (e.g., road surroundings or vehicle-traveling zone). More specifically, if a vehicle-traveling road exists at the location of the base station 302 or in the coverage of the base station, the server 303 may determine the corresponding zone as an enable zone. Further, the enable zone may be expressed by coordinates of four vertices (W, X, Y, Z) of the zone or by a center location (X, Y) and a radius of the zone.

The disable zone proposed in the disclosure is defined as follows. As an example, the disable zone may be a zone in which the pedestrian UE (P-UE) does not have to transmit the P2X message or a zone having low priority for the pedestrian UE (P-UE) to transmit the P2X message (e.g., zone in which no vehicle travels or park). More specifically, if a vehicle-traveling road does not exist at the location of the base station 302 or in the coverage of the base station, the server 303 may determine the corresponding zone as a disable zone. Further, the disable zone may be expressed by coordinates of four vertices (W, X, Y, Z) of the zone or by a center location (X, Y) and a radius of the zone.

The server 303 transmits the determined enable/disable zone information (location information) to the base station 302 (S320). Examples that can be included as the enable/disable zone information are as follows. As an example, the enable zone to be included may be expressed by coordinates of the four vertices (W, X, Y, Z) of the zone or by the center location (X, Y) and the radius of the zone. Further, as an example, the disable zone to be included may be expressed information received from the server 303. The zone configuration information for the enable/disable zone may include whether to transmit the P2X message in accordance with the zone type or a Tx parameter in accordance with the zone type. The zone type may include one or more zone IDs.

After creating the zone configuration information message, the base station 302 transmits the zone configuration information message to the UE 301 (S330). The zone configuration information message is system information, and unicast transmission of the zone configuration information message is possible as a broadcast or dedicated message (e.g., radio resource control (RRC) message).

FIG. 4 is a diagram illustrating an embodiment of the zone configuration information of FIG. 3 proposed in the disclosure.

According to an embodiment of the disclosure, in the case of operating in two types through designation of the zone type in the embodiment of FIG. 2, the UE may operate as follows. For example, the UE may operate to transmit the P2X message in the enable zone, and it may operate not to transmit the P2X message in the disable zone.

The base station may include an enable zone list or a disable zone list in the zone configuration information. In an embodiment, the enable zone list can include one or more zone IDs (e.g., zone IDs 1 to 5). Further, in an embodiment, the disable zone list can include one or more zone IDs (e.g., Zone ID 10 or Zone 11).

Further, in an embodiment, the zone configuration information may be included in system information block (SIB) 21. For example, configuration information for the enable/disable zone proposed in the disclosure can be added as p2x-zoneConig-r15 of the SIB 21.

```
SysteminformationBlockType21-r14 ::= SEQUENCE {
    s1-V2X-ConfigCommon-r14          SL-v2x-ConfigCommon-r14        OPTIONAL,   -- Need OR
    lateNonCriticalExtension         OCTET STRING                   OPTIONAL,
    ...
}
SL-V2X-ConfigCommon-r14 :: =     SEQUENCE {
    v2x-CommRxPool-r14               SL-CommRxPoolListV2X-r14       OPTIONAL,   -- Need OR
    v2x-CommTxPoolNormalCommon-r14   SL-CommTxPoolListV2X-r14       OPTIONAL,   -- Need OR
    p2x-CommTxPoolNormalCommon-r14   SL-CommTxPoolListV2X-r14       OPTIONAL,   -- Need OR
    v2x-CommTxPoolExceptional-r14    SL-CommResourcePoolV2X-r14     OPTIONAL,   -- Need OR
.........
    zoneConfig-r14                   SL-ZoneConfig-r14              OPTIONAL,   -- Need OR
    p2x-Zoneconfig-r15               SL-Zoneconfig-r15              ----------------------
.........
    cbr-CommonTxConfigList-r14       SL-CBR-CommonTxConfigList-r14  OPTIONAL-- Need OR
)
```

In p2x-zoneConig-r15, disableZoneList or enableZoneList may be included.

```
SL-ZoneConfig-r15 ::=      SEQUENCE {
    zoneLength-r14         ENUMERATED { m5, m10, m20, m50, m100, m200, m500, spare1},
    zonewidth-r14          ENUMERATED { m5, m20, m20, m50, m100, m200, m500, spare1},
    zoneIdLongiMod-r14     INTEGER (1..4),
    zoneIdLatiMod-r14      INTEGER (1..4),
    disableZoneList-r15    SEQUENCE (SIZE (1.. maxSize)) OF zoneID
    enableZoneDist-r15       SEQUENCE (SIZE (1.. maxsize)) OF zoneID
}
``` by coordinates of the four vertices (W, X, Y, Z) of the zone or by the center location (X, Y) and the radius of the zone.

The base station 302 may generate a zone configuration information message for configuring a transmission method in accordance with the zone using the enable/disable zone FIG. 5 is a diagram illustrating another embodiment that can be transmitted by zone configuration information of FIG. 3 proposed in the disclosure.

For example, in the embodiment of FIG. 2, a transmission parameter for each zone type may be designated and operated. In another embodiment, a transmission parameter for each zone ID in a zone type may be designated and operated. According to an embodiment of the disclosure, information that can be configured as the transmission parameter is as follows.

Data Tx period: Period for transmitting a P2X message (e.g., 10 ms or 100 ms or 1 sec or 1 min or etc.)

Or, Tx power: Tx power for transmitting a P2X message (e.g., 10 dB or x dB or etc.)

Or, the number of hybrid automatic retransmission requests (HARD): the number of HARQs Or, the number of MAX retransmissions (e.g., the maximum number of data retransmissions)

Or, resource selection: a resource selection method (e.g., sensing or partial sensing or random selection)

The above-described transmission parameters may be configured by adjusting the corresponding parameter values by zone IDs.

As an embodiment of the disclosure, an embodiment in which system configuration information for an enable/disable zone proposed in the disclosure is included in system information block 21 is as follows.

In the case of being included in the SIB 21 of an LTE system, the configuration information of the enable/disable zone can be added to Zone-CommmonTx-ConfigList-r15.

FIG. 5, respectively. In the case of designating and operating transmission parameters by zone types while designating and operating two zone types (e.g., enable zones/disable zones), the transmission parameters for the zone types can be operated in the same manner as that in FIG. 4. An embodiment of configurable information with respect to the transmission parameters by zone types can be operated in the same manner as that in FIG. 5.

The base station may configure zone configuration information by configuring transmission parameters regardless of the zone IDs by zone types.

Figure 7:
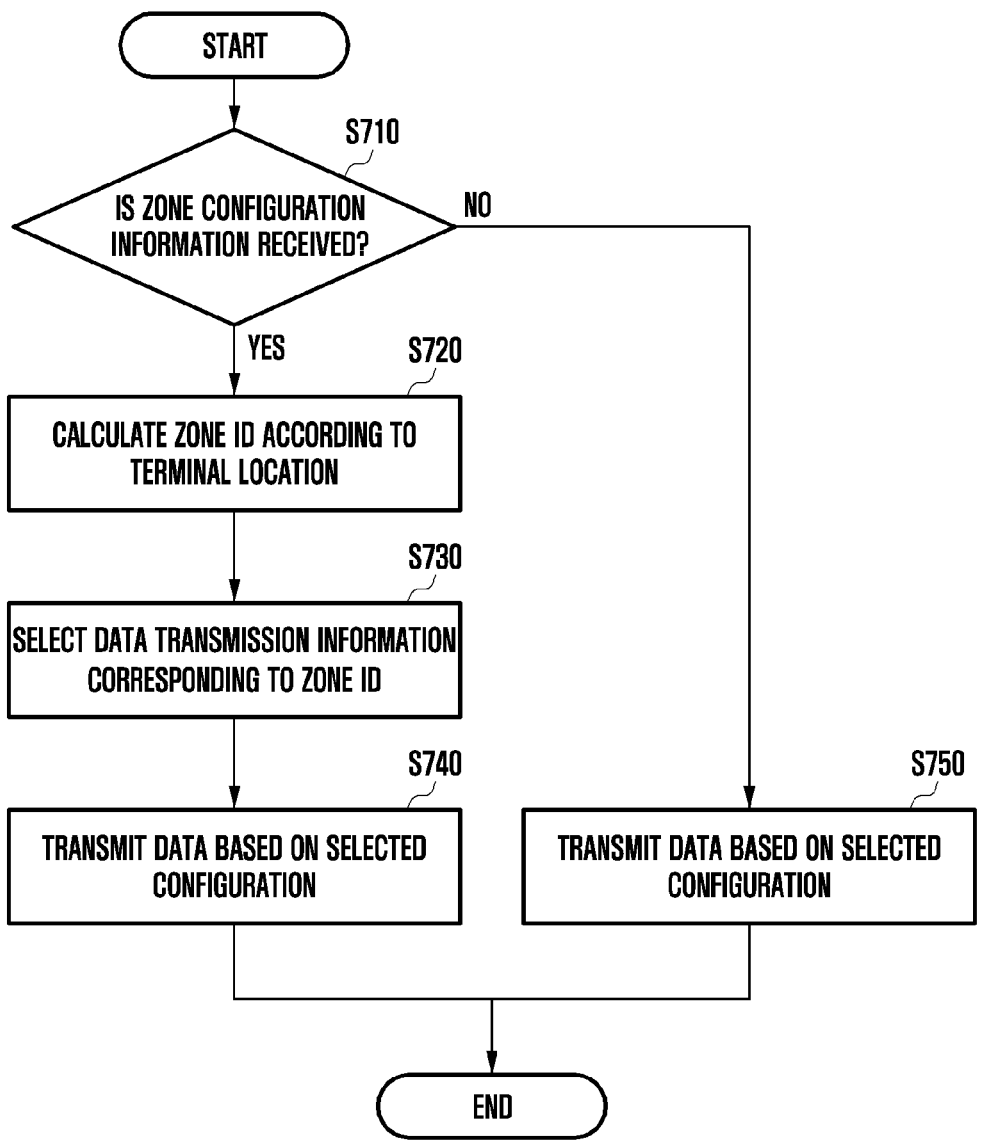
FIG. 7 is a diagram illustrating an operation of a terminal in the case of using a method proposed in the disclosure.

FIG. 7 is a diagram illustrating an operation of a terminal in the case of using a method proposed in the disclosure.

A terminal (UE) can receive zone configuration information from a base station through system information or dedicated signaling (S710). If the terminal receives the zone configuration information from the base station, it may operate as follows.

The terminal determines the zone ID through the location of the terminal in accordance with the width and length corresponding to information included in the zone configuration information (S720). Further, the terminal may select data transmission information according to the zone ID (S730). For example, the terminal can select the Tx parameter in accordance with the zone ID or the zone type

```
SL-V2X-ConfigCommon-r14 ::=            SEQUENCE {
.........
       zoneConfig-r14                   SL-ZoneConfig-r14
.........
       cbr-CommonTxConfigList-r14       SL-CBR-CommonTxConfigList-r14
       Zone -CommonTxConfigList-r15     SL-Zone-CommonTxConfigList-r15
}
    SL-zone-CommonTxConfig ::=          SEQUENCE {
          ZoneID                        INTEGER (0..7),
          allowedTransmission           ENUM (True, False),
          periodTransmission            ENUM (10ms, 100ms, 1000ms, ...),
          maxHARQRetransmission         ENUM (n1, n2, ...... , n16),
          maxRepetition                 ENUM (n0, n1)
          maxTxPower-r14                INTEGER (-41...-31)
       }
```

As another embodiment of the disclosure, in the case of including the transmission parameters of the enable/disable zones in a resource pool, they can be included as p2x-dataTxparameters-r15 of the resource pool. In the case of an embodiment in which transmission parameters of enable/disable zones are included in a resource pool, enable zones or disable zones may be configured for each resource pool.

corresponding to the zone ID. The zone type may be discriminated into enable zones and disable zones.

Further, the terminal can transmit data using the selected configuration information, such as the zone ID, the Tx parameter, and the zone type (S740). For example, if the Tx parameter in accordance with the zone ID is selected, it is possible to transmit a P2X message through configuration of

```
SL-CommResourcePoolV2X-r14 ::=         SEQUENCE {
......
       zoneID-r14                       INTEGER (0..7)
......
       p2x-dataTxparameters-r15         SL-Zone-TxParameter
       . . .
    }
SL-Zone-TxParameter ::=                SEQUENCE {
       allowedTransmission              ENUM (True, False),
       periodTransmission               ENUM(10ms, 100ms, 1000ms, ...),
       maxHARQRetransmission            ENUM (n1, n2, ...... , n16),
       maxRepetition                    ENUM (n0, n1)
       maxTxPower-r14                   INTEGER (-41...31)
}
```

FIG. 6 is a diagram illustrating an embodiment of usage methods of FIGS. 4 and 5 proposed in the disclosure.

For example, parameters of FIG. 6 may be indicated as combinations of parameters of FIG. 4 and parameters of the Tx parameter corresponding to the zone ID corresponding to the location of the terminal. As another example, if the enable zone type is selected based on the zone ID corresponding to the location of the terminal, the terminal can transmit the P2X message. As another embodiment, if the zone type corresponding to the zone ID is the disable zone type, the terminal may not transmit the P2X message.

As another embodiment, if different transmission parameters are received from the base station in the zone types of the enable zone and the disable zone based on the zone ID, the terminal may transmit the transmission parameter in Tx period of 100 ms and with Tx power of x dB in the enable zone, and it may transmit the transmission parameters in Tx period of 1000 ms and with Tx power of y dB in the disable zone.

As still another embodiment, if different transmission parameters by zone IDs are received from the base station, the terminal may transmit data through configuration of the transmission parameter in accordance with the zone ID. For example, if the transmission parameter configured in the case where the zone ID is "1" is in the Tx period of 100 ms and with the Tx power of x2 dB, it is possible to transmit the data based on the corresponding Tx configuration.

If the terminal is unable to receive the zone configuration information from the base station, the terminal can transmit the data using preconfigured setting information (S750). For example, terminal may use information pre-stored therein, and the terminal can receive the corresponding information from the base station during an initial access by the terminal as preconfigured setting information. As another embodiment, the preconfigured setting information can be received from a USIM of the terminal. As another embodiment, the preconfigured setting information can be received in an over the air (OTA) method.

Further, As an embodiment, the preconfigured setting information may include a data Tx period (that is a period for transmitting the P2X message, and it can be expressed as 10 ms or 100 ms or 1 sec or 1 min or the like), a Tx power (that is a Tx power for transmitting the P2X message, and it can be expressed as 10 dB or x dB or the like), the number of HARQs, the maximum number of retransmissions, or a resource selection (method) (e.g., partial sensing or random selection).

Figure 8:
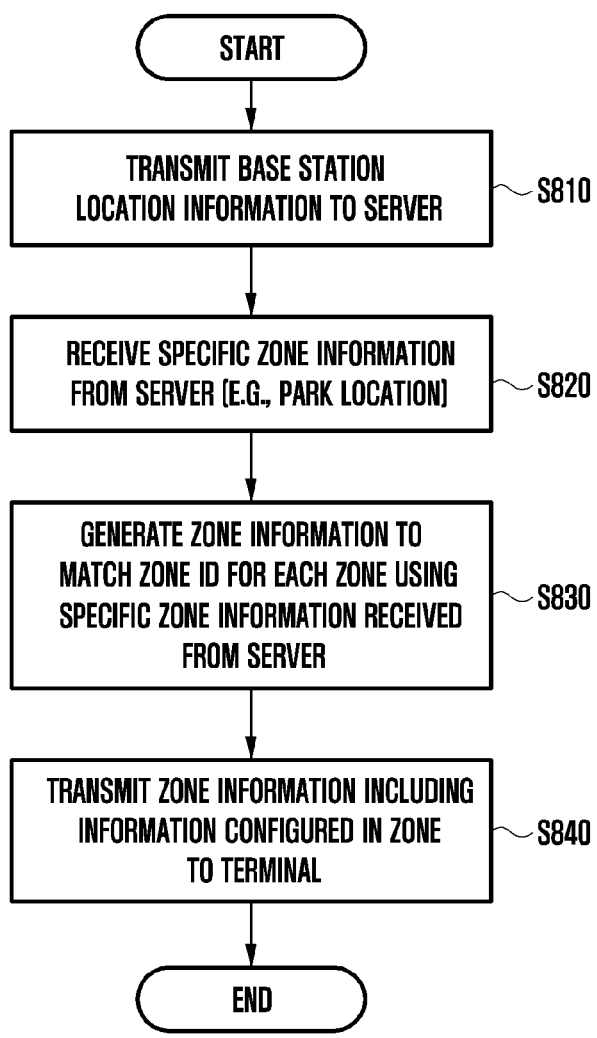
FIG. 8 is a diagram illustrating an operation of a base station in the case of using a method proposed in the disclosure.

FIG. 8 is a diagram illustrating an operation of a base station in the case of using a method proposed in the disclosure.

A base station may transmit information related to the location of the base station to a server (S810). An example of the information related to the location of the base station may include base station location (e.g., X, Y) and base station coverage information. Further, the base station coverage can be calculated in the following example.

Base station coverage=MAX # of latitude*MAX zone width

After transmitting the location information of the base station to the server, the base station may receive specific zone information from the server (S820). Examples of specific zone information (enable/disable zone) are as follows. In the case where the enable/disable zone information is included, the disable zone may be expressed by coordinates of four vertices (W, X, Y, Z) of the zone or by a center location (X, Y) and a radius of the zone. Further, the enable zone may be expressed by coordinates of four vertices (W, X, Y, Z) of the zone or by a center location (X, Y) and a radius of the zone.

The base station may generate zone information to match each zone ID using the specific zone information received from the server (S830). For example, as an example of a method for the base station to confirm whether the zone ID is included in the enable/disable zone, the base station may use the enable/disable zone for each zone ID through the coordinates of four vertices (W, X, Y, Z) of the zone received from the server or by the center location (X, Y) and the radius of the zone. For example, the base station may calculate the range of the geographical location (e.g., coordinates) through the determined zone ID. If the range of the coordinates of the zone ID calculated by the base station is within the coordinates of four vertices (W, X, Y, Z) of the specific zone sent by the server or within the range of the center location (X, Y) and the radius of the zone, the base station may determine the zone as the enable zone.

As an embodiment of the disclosure for creating the zone information, if the zone ID is included in the enable zone in a state where the zone information is generated as the zone type, the zone ID may be included in an enable zone list, whereas if the zone ID that is included in the disable zone, the zone ID may be included in a disable zone list. As another embodiment of the disclosure, if the zone ID is included in the enable zone in a state where the zone information is generated as Tx parameter information for the zone ID, the Tx parameter may be configured to have a high transmission priority (e.g., short service delay time and data Tx period of 10 ms are configured), whereas if the zone ID is included in the disable zone, the Tx parameter may be configured to have a low transmission priority (e.g., long service delay time and data Tx period of 1000 ms are configured).

The base station may transmit the zone information generated in the above-described method to the terminal as a zone configuration information message (S840), and the corresponding message can be transmitted as system information or a dedicated message.

Figure 9:
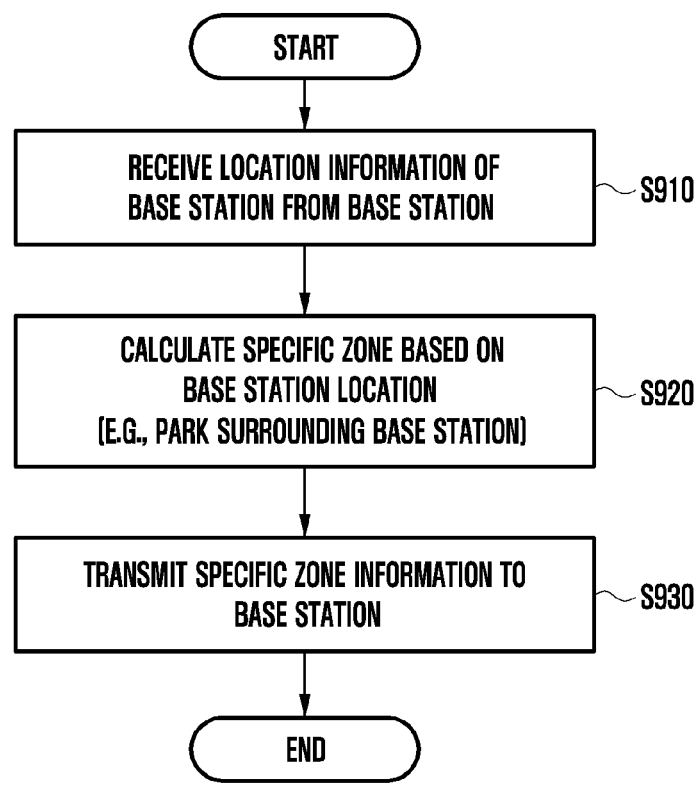
FIG. 9 is a diagram illustrating an operation of a server in the case of using a method proposed in the disclosure.

FIG. 9 is a diagram illustrating an operation of a server in the case of using a method proposed in the disclosure.

A server may receive location information of a base station from the base station (S910). An example of information related to the location of the base station may include base station location (e.g., X, Y) and base station coverage information.

The server may calculate a specific zone (e.g., park around the base station) based on the location of the base station (S920). For example, after receiving the information related to the location of the base station, the server determines surrounding enable/disable zone information based on the corresponding information.

In the disclosure, the enable zone is defined as follows. As an example, the enable zone is defined as a zone in which a pedestrian UE (P-UE) should transmit a P2X message or a zone having high priority for the pedestrian UE (P-UE) to transmit the P2X message or road surroundings or a zone in which a vehicle travels.

Further, in the disclosure, the disable zone is defined as follows. As an example, the disable zone is defined as a zone in which the pedestrian UE (P-UE) does not have to transmit the P2X message or a zone having low priority for the pedestrian UE (P-UE) to transmit the P2X message or a zone in which no vehicle travels or a park.

For example, if a park exists at the location of the base station or in the base station coverage, the server can determine the corresponding zone as the disable zone. The disable zone can be expressed by coordinates of four vertices (W, X, Y, Z) of the zone or by a center location (X, Y) and a radius of the zone.

The server may transmit the determined enable/disable zone information to the base station (S930). As information that can be included in the enable/disable zone, the disable zone may include the coordinates of four vertices (W, X, Y, Z) of the zone or the center location (X, Y) and the radius of the zone, and the enable zone may include the coordinates of four vertices (W, X, Y, Z) of the zone or the center location (X, Y) and the radius of the zone.

As described above, although a case where the server and the base station are separated from each other as separate entities has been described, it is also possible that the server function according to an embodiment of the disclosure can be implemented within the base station.

Figure 10:
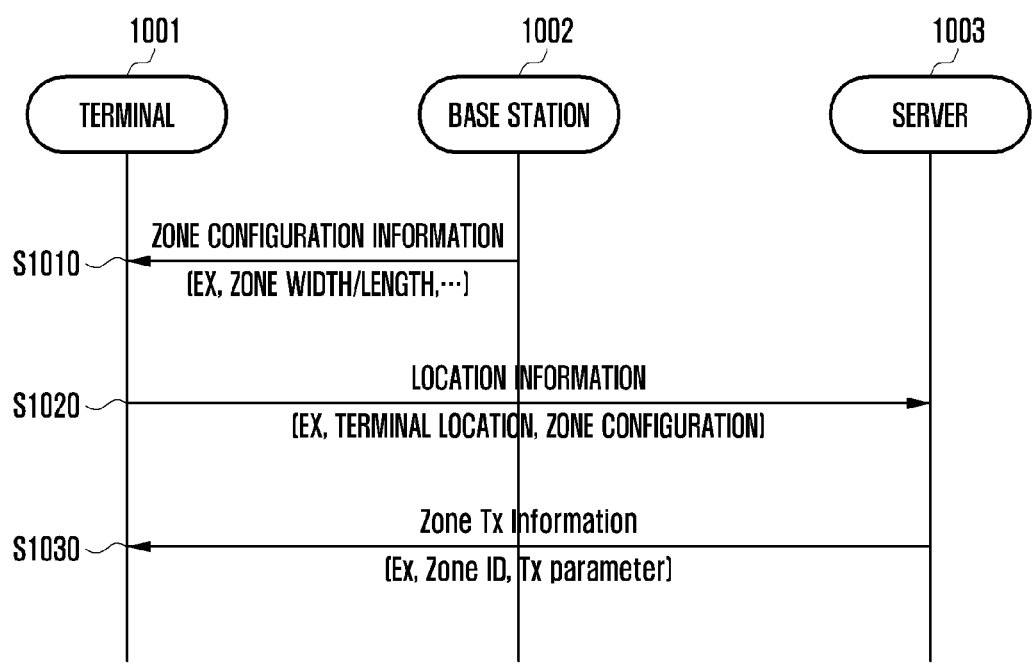
FIG. 10 is a diagram illustrating a case where a terminal receives zone-related Tx information using a server according to another embodiment of a method proposed in the disclosure.

FIG. 10 is a diagram illustrating a case where a terminal receives zone-related Tx information using a server according to another embodiment of a method proposed in the disclosure.

A base station 1002 may transmit zone configuration information to a terminal 1001 (S1010). In an LTE system, information that can be included in a zone configuration information message may be a zone length, a zone width, zoneIdLongiMod, and zoneIdLatiMod.

After receiving the zone configuration information from the base station 1002, the terminal 1001 may transmit zone-related information of the terminal to a server 1003 (e.g., device capable of using MAP information) as location information (S1020). An embodiment of the information that can be included in the location information may include UE location information or zone configuration information (zoneLength, zoneWidth, zoneIdLongiMod, and zoneIdLatiMod) that is received from the base station.

The server calculates the zone ID of a place where the terminal 1001 is located using the location information transmitted by the terminal 1001, and then it generates a zone Tx parameter corresponding to the zone ID. As another embodiment, the server 1003 may determine the zone type corresponding to the zone ID, and it may generate the zone Tx parameter corresponding to the zone type. The zone Tx parameter may include the information of FIGS. 4, 5, and 6. Thereafter, the server 1003 transmits the zone Tx information including at least one of the zone ID, zone type, or zone Tx parameter to the terminal 1001 (S1030).

Figure 11:
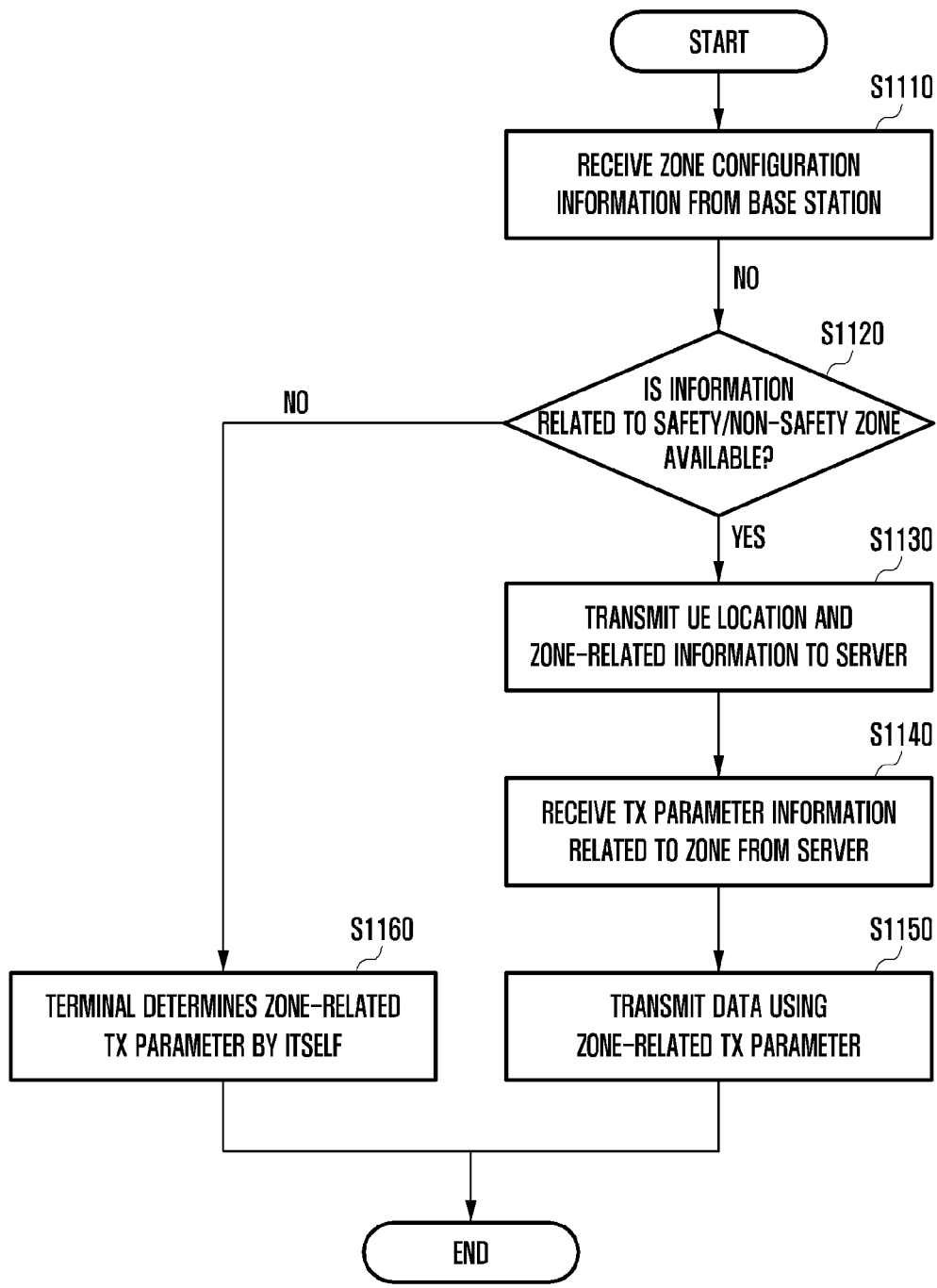
FIG. 11 is a diagram illustrating an operation of a terminal of FIG. 10 according to a method proposed in the disclosure.

FIG. 11 is a diagram illustrating an operation of a terminal according to another embodiment (FIG. 10) proposed in the disclosure.

A terminal receives zone configuration information from a base station (S1110). In an LTE system, an embodiment of information that can be included in a zone configuration information message can include zoneLength, zoneWidth, zoneIdLongiMod, and zoneIdLatiMod.

The terminal confirms whether it can use information related to an enable/disable zone (S1120). For example, the terminal confirms whether there is a server that supports enable/disable zone configuration.

In the case where the terminal can use the enable/disable zone configuration information, it transmits UE location and zone-related information to the server (S1130). For example, in the LTE system, the UE location, i.e., an example of X, Y coordinates through a global positioning system (GPS) or zone-related information, may include zoneLength, zoneWidth, zoneIdLongiMod, and zoneIdLatiMod to be transmitted.

The terminal may receive zone-related Tx parameter information from the server (S1140). For example, the terminal can receive the Tx parameter allocated to the zone ID. As another embodiment, the terminal can receive the zone type corresponding to the zone ID and the Tx parameter corresponding to the zone type. As the zone ID, zone type, and Tx parameter information, the terminal can receive the information of FIG. 4, 5, or 6.

The terminal may transmit data using the zone-related Tx parameter received from the server (S1150). In the case of receiving the Tx parameter corresponding to the enable zone in accordance with the location of the terminal, the terminal may transmit a P2X packet. Further, in the case of receiving the Tx parameter corresponding to the disable zone in accordance with the location of the terminal, the terminal does not transmit the P2X packet.

As another embodiment, if different transmission parameters in different zone types of the enable zone and the disable zone based on the zone IDs are received from the base station, the terminal may transmit the transmission parameter in Tx period of 100 ms and with Tx power of x dB in the enable zone, whereas the terminal may transmit the transmission parameter in Tx period of 1000 ms and with Tx power of y dB in the disable zone.

As still another embodiment, if different transmission parameters by zone IDs are received from the base station, the terminal may transmit data through configuration of the transmission parameter in accordance with the zone ID. For example, if the transmission parameter configured in the case where the zone ID is "1" is in the Tx period of 100 ms and with the Tx power of x2 dB, the terminal can transmit the data through the corresponding Tx configuration.

Further, if it is determined that the terminal is unable to use the configuration information related to the enable/disable zone, the terminal may transmit a P2X packet by self-determining the zone-related Tx parameter corresponding to the location of the terminal.

Figure 12:
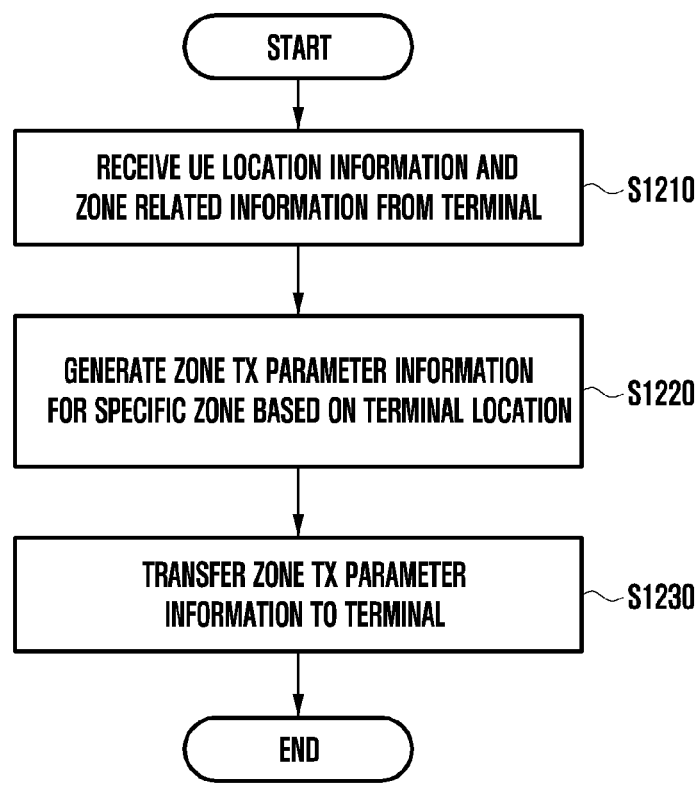
FIG. 12 is a diagram illustrating an operation of a server of FIG. 10 according to a method proposed in the disclosure.

FIG. 12 is a diagram illustrating an operation of a server according to another embodiment (FIG. 10) proposed in the disclosure.

A server may receive UE location information and zone-related information from a terminal. For example, in an LTE system, as an example of the UE location (i.e., X, Y coordinates through GPS) or zone-related information, zoneLength, zoneWidth, zoneIdLongiMod, and zoneIdLatiMod may be received.

The server may generate zone Tx parameter information for a specific zone based on the terminal location (S1220). For example, the server calculates the zone ID of the terminal using the terminal location and the zone-related information. The server confirms whether the zone ID of the terminal is included in the enable zone using MAP information that the server has. If the zone ID is included in the enable zone, the server determines the zone ID as the enable zone type, and it can configure the Tx parameter that is suitable to the enable zone. Further, if the zone ID is included in the disable zone, the server determines the zone ID as the disable zone type, and it can configure the Tx parameter that is suitable to the disable zone.

The server transmits the determined zone Tx parameter information to the terminal (S1230). The zone Tx parameter information may include at least one of the zone ID, the zone type, or the Tx parameter.

Figure 13:
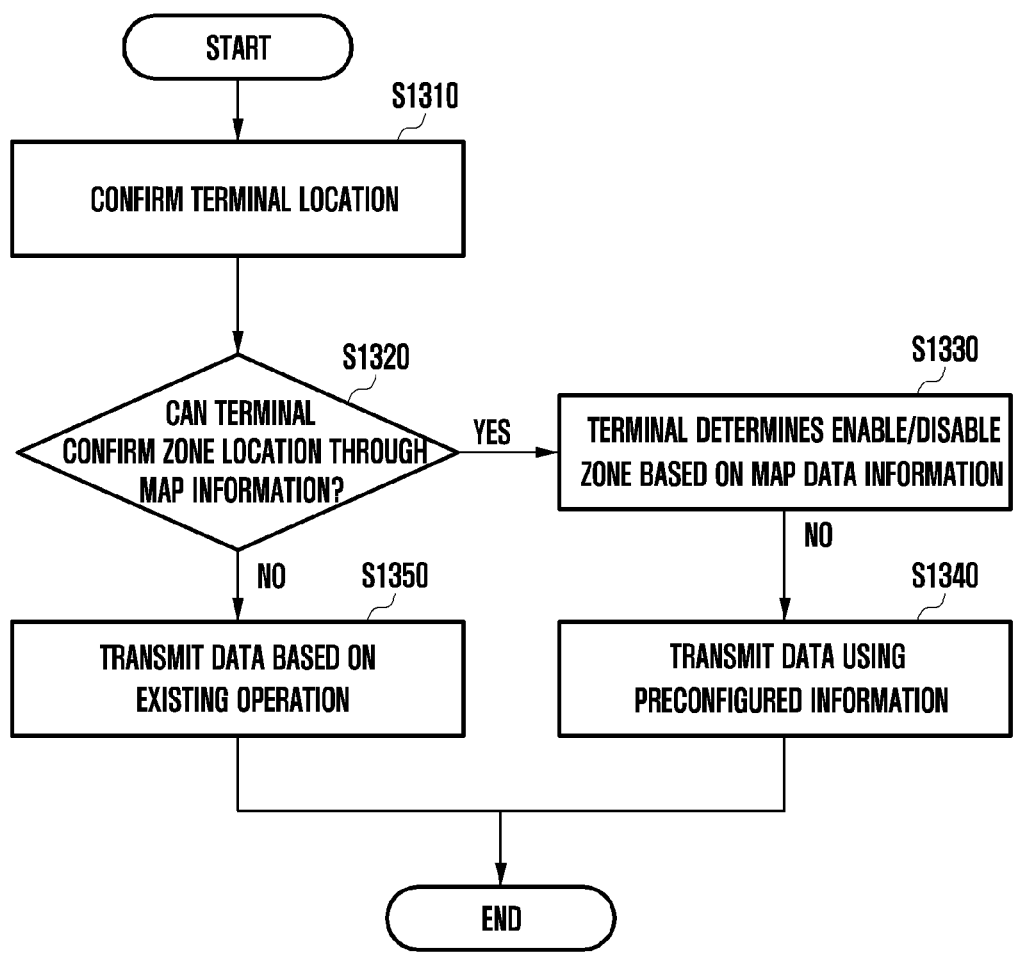
FIG. 13 is a diagram illustrating a method by a terminal itself for determining a zone-related Tx parameter at an operation of FIG. 11 according to a method proposed in the disclosure.

FIG. 13 is a diagram illustrating a method by a terminal itself for determining a zone Tx parameter at an operation of FIG. 11 according to a method proposed in the disclosure.

A terminal may confirm the location of the terminal using a sensor (e.g., GPS or the like) (S1310). After confirming the location, the terminal confirms whether it is possible to use MAP information through a higher layer (e.g., app or the like) (S1320).

If it is possible to use the MAP information, the terminal determines the enable/disable zone based on data information of the MAP (S1330). Here, a method for determining the enable/disable zone is as follows. The MAP data includes specific zone information (e.g., coordinates of four vertices (W, X, Y, Z) or a center location (X, Y) and a radius of the zone), and if the terminal location is within the range of the specific zone, the terminal may determine the zone as the enable zone. After determining the enable/disable zone, the terminal transmits data through adjustment of the Tx parameter to match the enable/disable zone configuration using preconfigured information that is pre-stored (S1340).

As another embodiment, if whether to transmit a P2X message is configured in accordance with the zone in information preconfigured by enable/disable zones, the following operations may be performed. If a place where the terminal is located is a zone configured as enable, the terminal may transmit the P2X message. Further, if the place where the terminal is located is a zone configured as disable, the terminal may not transmit the P2X message.

The preconfigured information may be pre-stored in the terminal (during manufacturing) to be usable, or the terminal may receive preconfigured setting information from the base station during an initial access. As another embodiment, the preconfigured information can be acquired in an OTA method. Further, the preconfigured setting information may include a data Tx period (period for transmitting the P2X message that can be expressed as 10 ms or 100 ms or 1 sec or 1 min) or a Tx power (Tx power for transmitting the P2X message that can be expressed as 10 dB or x dB), # of HARQs (the number of HARQs), MAX # of retransmissions (Maximum # of data retransmissions), resource selection: resource selection method (sensing, partial sensing or random selection).

If the terminal is unable to use the MAP information, it may transmit the data through the existing operation (S1350). For example, in the case of the LTE system, the terminal may perform P2X basic operation.

Figure 14:
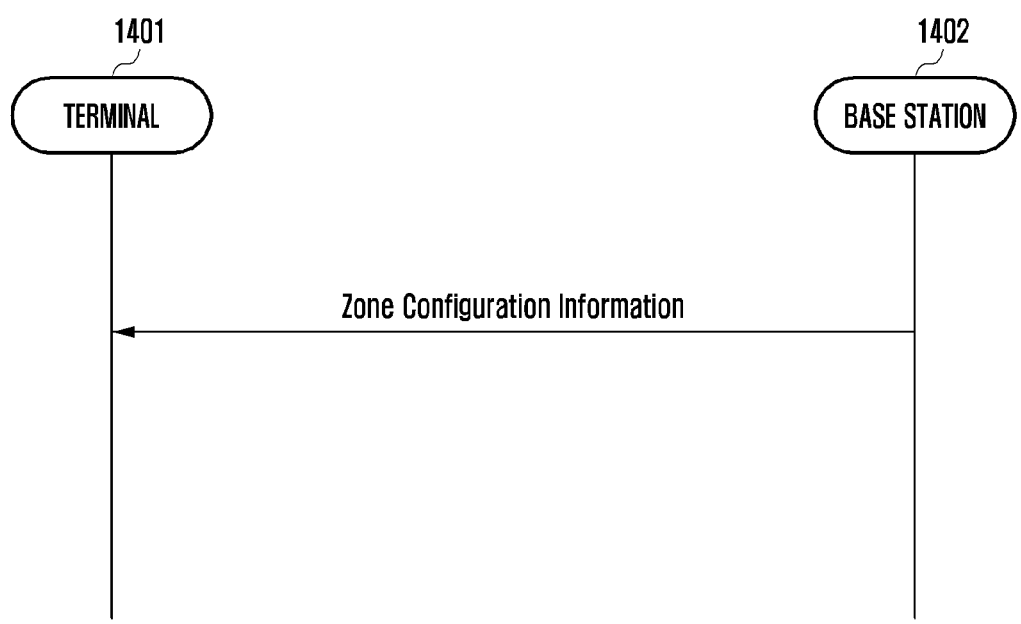
FIG. 14 is a diagram illustrating an operation of a base station proposed in the disclosure in the case where the base station includes MAP data.

FIG. 14 is a diagram illustrating an operation of a base station in the case where the base station includes MAP data.

In the case of including MAP data, a base station can generate enable/disable zone information. A method for creating enable/disable zone information is as follows. The MAP data included in the base station includes specific zone information (e.g., coordinates of four vertices (W, X, Y, Z) or a center location (X, Y) and a radius of the zone), and the base station may determine the range of coordinates of the zone ID through the zone ID. The base station may determine the enable/disable zone through the range of the coordinates of the zone ID and the MAP data information. Further, the base station can generate zone configuration information capable of configuring a transmission method in accordance with the zone using the enable/disable zone, and an example of information that can be included in the zone configuration information may include whether to transmit the P2X message in accordance with the zone type or the Tx parameter in accordance with the zone ID.

Further, the base station can include even information for the terminal to generate the zone ID in the zone configuration information. For example, in the case of an LTE system, zoneLength, zoneWidth, zoneIdLongiMod, and zoneIdLatiMod can be included. The base station may use system information or a dedicated message (e.g., RRC message) in order to transmit the zone configuration information to the terminal.

Hereinafter, in the disclosure proposed with reference to FIGS. 15 to 22, an embodiment of a condition for the base station to add sidelink secondary cell (SCell) is as follows.

In embodiment 2-1-1 of the disclosure, if there is an overhead of a traffic load of a sidelink primary cell (PCell) being used by the terminal, for example, if x % or more of resources of the sidelink PCell is being used, the base station may add the sidelink SCell.

In embodiment 2-1-2 of the disclosure, if a service type (e.g., support of a service having a period of 1000 ms) is determined in the sidelink SCell, the base station may add the sidelink SCell through traffic information being used by the terminal. For example, if the terminal requires SPS configuration capable of transmitting data in a period of 1000 ms, the base station may add the sidelink SCell of the determined service type.

In embodiment 2-1-3 of the disclosure, in the case of a high channel congestion of the sidelink PCell being used by the terminal, for example, if a channel busy ratio (CBR) value is equal to or higher than y %, the base station may add the sidelink SCell.

In embodiment 2-1-4 of the disclosure, if the channel environment of the sidelink PCell being used by the terminal is not good, for example, if a signal to interference and noise ratio (SINR) value is equal to or lower than z dB %, the base station may add the sidelink SCell.

In embodiment 2-1-5 of the disclosure, the sidelink SCell can be added through a buffer status being used by the terminal in the sidelink PCell. For example, if the number of uplink grants being requested within a specific time is equal to or larger than a predetermined number, or if an uplink grant request continues for a predetermined time, the base station may add the sidelink SCell.

Further, an embodiment of a condition on which the base station releases the sidelink SCell is as follows.

In embodiment 2-2-1 of the disclosure, if an overhead of a traffic load of a sidelink SCell being used by the terminal is reduced, for example, if x % or less of resources of the sidelink PCell is being used, the base station may release the sidelink SCell.

In embodiment 2-2-2 of the disclosure, if a service type (e.g., support of a service having a period of 1000 ms) is determined in the sidelink SCell, the base station may release the sidelink SCell after SPS transmission being used by the terminal in the sidelink SCell is completed.

In embodiment 2-2-3 of the disclosure, in the case of a high channel congestion of the sidelink SCell being used by the terminal, for example, if a CBR value is equal to or higher than y %, the base station may release the sidelink SCell.

In embodiment 2-2-4 of the disclosure, if the channel environment of the sidelink SCell being used by the terminal is not good, for example, if the SINR value is equal to or lower than z1 dB %, the base station may release the sidelink SCell.

In embodiment 2-2-5 of the disclosure, the sidelink SCell can be released through a buffer status being used by the terminal in the sidelink PCell. For example, if the number of uplink grants being requested within a specific time is equal to or lower than a predetermined number, or if an uplink grant request continues below a predetermined time, the base station may release the sidelink SCell.

Figure 15:
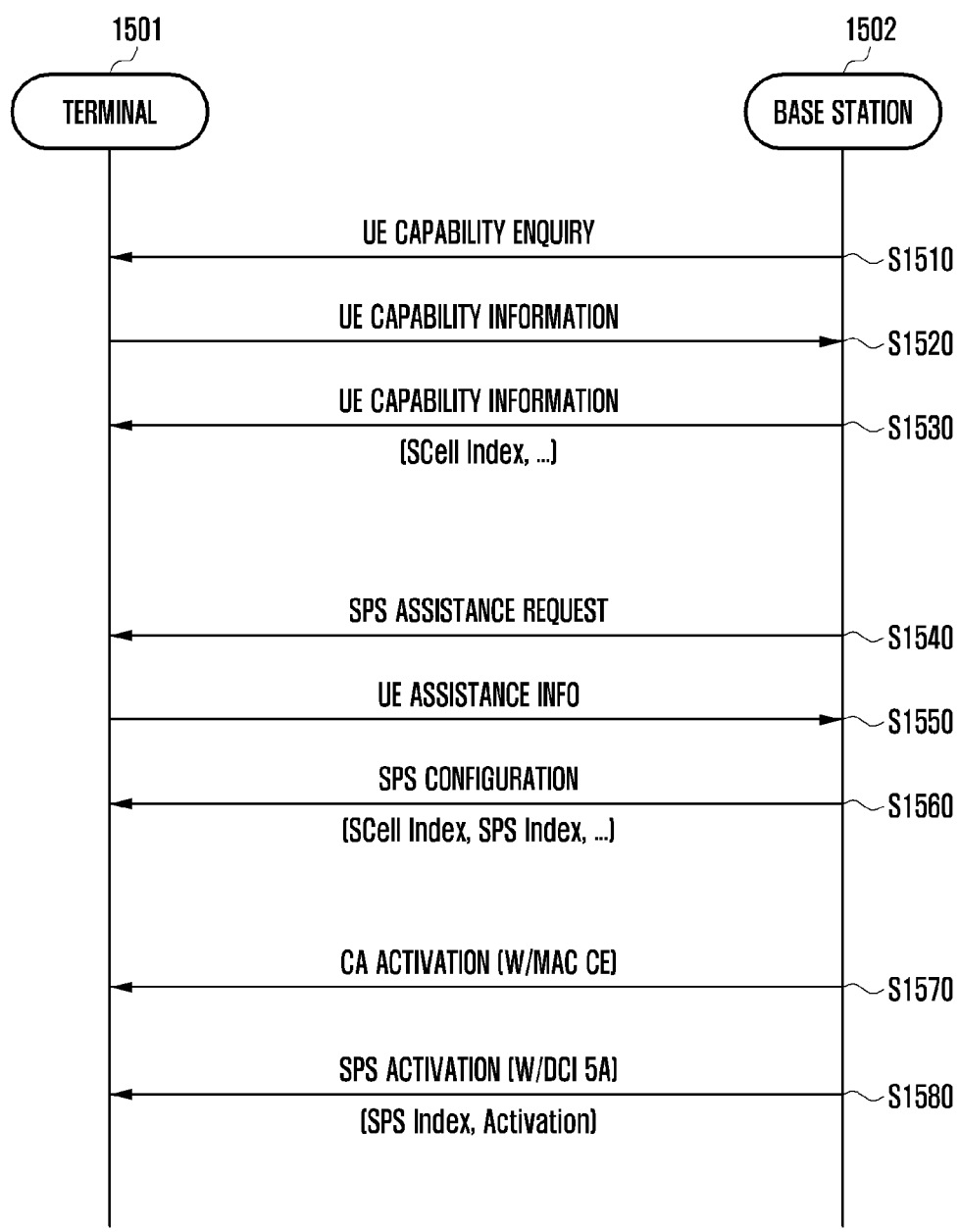
FIG. 15 is a diagram illustrating a method by a base station and a terminal for configuring and operating SPS on a sidelink PCell and a sidelink SCell while operating a sidelink CA according to a method proposed in the disclosure.

FIG. 15 is a diagram illustrating a method by a base station and a terminal for configuring and operating semi-persistent scheduling (SPS) on a PCell and a SCell while operating a sidelink carrier aggregation (CA) in a method proposed in the disclosure.

A base station 1502 may request a terminal 1501 to confirm whether the terminal can support the carrier aggregation through UE capability enquiry (S1510). The terminal 1501, after receiving the UE capability enquiry, may transmit carrier information (e.g., RF parameter or the like) that can be used as UE capability information to the base station (S1520). After receiving the UE capability information, the base station 1502 transmits carrier aggregation (CA) configuration information using carrier information that can be supported by the UE (S1530). For example, SCell index, frequency, physical cell ID (PhysicalCellID), and SCell deactivation timer may be included in the CA configuration information. The carrier aggregation configuration may be transmitted as a radio resource control (RRC) message.

With reference to FIG. 15, the base station 1502 (e.g., eNB) may request data traffic information being serviced by the terminal by transmitting a SPS assistance request for configuring the SPS to the terminal 1501 (S1540). The SPS assistance request message may be transmitted by a RRC message or system information.

If the SPS assistance request is received, the terminal 1501 may transmit, to the base station 1502, UE assistance information including the data traffic information being serviced by the terminal 1501 (S1550). For example, the data traffic size and the transmission period may be included as the data traffic information. The UE assistance message may be transmitted by a the RRC message.

After receiving the UE assistance information from the terminal 1501, the base station 1502 can be aware of the characteristics of the data traffic being serviced by the terminal 1501. The base station 1502 can transmit one or more SPS configurations to the terminal 1501 to match the service characteristics using the traffic characteristics (S1560). The SPS configuration information for operating the SPS in the SCell may include a SPS index, SCell index, and SPS interval. For example, if the data transmission period among the traffic characteristics is 100 ms, the base station 1502 may indicate a carrier to which the SPS is applied using the SCell index, and it may transmit the configuration information to the terminal so as to transmit the data in a period of 100 ms through configuration of the SPS interval value to 100 ms.

The SPS configuration information for operating the SPS in the PCell may include an SPS index and an SPS interval. For example, if the data transmission period is 100 ms in consideration of the traffic characteristics, the SPS configuration information that the base station 1502 transmits to the terminal 1501 may include the SPS index and the SPS interval. That is, if there is not the SCell index, the SPS can be applied to the PCell, and the configuration information can be transmitted to the terminal so that the data can be transmitted in the period of 100 ms through configuration of the SPS interval value to 100 ms.

The SPS configuration information for operating the SPS in the PCell/SCell may include a carrier index, SPS index, and SPS interval. For example, if the data transmission period is 100 ms in consideration of the traffic characteristics, the SPS configuration information that the base station 1502 transmits to the terminal 1501 can clearly indicate the PCell or SCell by the carrier index, and the configuration information can be transmitted to the terminal so that the data can be transmitted in the period of 100 ms through configuration of the SPS interval value to 100 ms.

The base station 1502 may indicate CA activation of a carrier to be activated through a medium access control (MAC) control element (CE) (S1570), and after indicating the CA activation, the base station 1502 may indicate the SPS activation using the SPS index included in downlink control information (DCI) (S1580).

Figure 16:
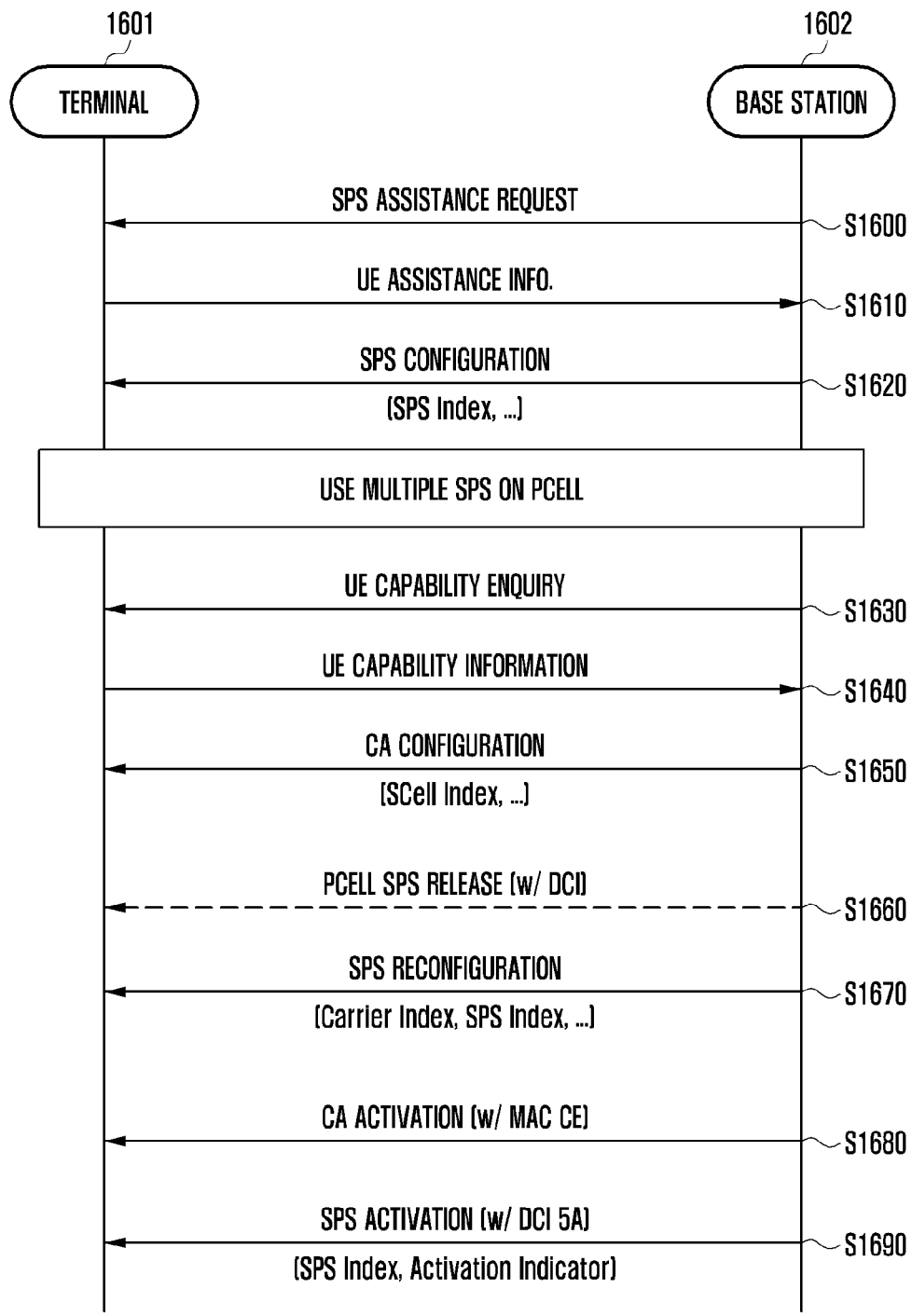
FIG. 16 is a diagram illustrating a method for configuring and operating SPS information on a sidelink SCell while operating several SPSs on a sidelink PCell proposed in the disclosure.

FIG. 16 is a diagram illustrating a method for configuring and operating SPS information on a sidelink SCell while operating several SPSs on a sidelink PCell proposed in the disclosure.

A base station 1602 and a terminal 1601 may basically operate several SPSs in a PCell. For example, with reference to FIG. 16, the base station 1602 (e.g., eNB) may request data traffic information being serviced by the terminal 1601 by transmitting a SPS assistance request for configuring the SPS to the terminal 1601 (S1600). The SPS assistance request message may be transmitted by a RRC message or system information.

If the SPS assistance request is received, the terminal 1601 may transmit, to the base station 1602, UE assistance information including the data traffic information being serviced by the terminal 1601 (S1610). For example, the data traffic size and the transmission period may be included as the data traffic information. The UE assistance message may be transmitted by the RRC message.

After receiving the UE assistance information from the terminal 1601, the base station 1602 can be aware of the characteristics of the data traffic being serviced by the terminal 1601. The base station 1602 can transmit one or more SPS configurations to the terminal 1601 to match the service using the traffic characteristics (S1620). For example, if the data transmission period among the traffic characteristics is 100 ms, the base station 1602 may configure the SPS interval to 100 ms to transmit the SPS interval to the terminal 1601. Through the above-described method, the base station 1602 may operate several SPSs in the PCell before operating the SCell.

The base station 1602 may request the terminal 1601 to confirm whether the terminal can support the carrier aggregation through a UE capability enquiry (S1630). Although it is illustrated in the drawing that UE capability enquiry, UE capability information, and CA configuration transactions for configuring the carrier aggregation of the terminal are performed after the SPS configuration of the PCell, it is also possible to perform the transactions before the SPS configuration of the PCell in accordance with the operation of the base station.

After receiving the UE capability enquiry, the terminal 1601 may transmit carrier information (e.g., RF parameter or the like) that can be used as the UE capability information to the base station 1602 (S1640).

After receiving the UE capability information, the base station 1602 transmit s the carrier aggregation (CA) configuration information to the terminal using the carrier information that can be supported by the UE (S1650). For example, SCell index, frequency, PhysicalCellID, SCell deactivation timer, and the like may be included in the CA configuration information. The carrier aggregation configuration may be transmitted as the RRC message.

According to an embodiment of the disclosure, the base station 1602 can be aware that the terminal 1601 can use several carriers through the UE capability information, and it can change the SPS configuration so that the SPS being operated in the PCell is operated in the SCell in accordance with the data load situation of the base station. For example, the base station may indicate that the traffic that is transmitted and received in the PCell can be transmitted and received in the SCell through comparison of the load situation of the PCell with the load situation of the SCell.

In a method for the SPS being operated in the PCell to be changed to operate in the SCell according to an embodiment of the disclosure, the base station 1602 may release the SPS configuration of the PCell (S1660), and it may transmit SPS reconfiguration information to the terminal 1601 so as to configure the SPS in the SCell (S1670). The SPS Reconfiguration information may include SCell Index, SPS Index, and SPS Interval.

Nos. 3 to 8 are configured (e.g., only for services except for Nos. 1 and 2). If the base station should allocate SPS configuration Nos. 1 and 2 to the PCell, it may notify the terminal of such configuration information through the SPS reconfiguration message.

For example, the SPS reconfiguration information may include the carrier index of "0" to notify of the applicability to the PCell, and SPS index 001 may indicate the SPS configuration period of 100 ms.

In order to use the carrier index in an LTE system, carrierIndex-r15 may be added to SPS-configSL-r14 information to be used as follows.

```
SPS-ConfigSL-R154 ::=   SEQUENCE {
    carrierIndex-r15           carrierIndex-r15,
    sps-ConfigIndex-r14        SPS-ConfigIndex-r14,
    semiPersistSchedIntervalSL-r14   ENUMERATED {
                                sf20, sf50, sf100, sf200, sf300, sf400,
                                sf500, sf600, sf700, sf800, sf900, sf1000,
                                spare4, spare3, spare2, spare1}
}
```

As another embodiment of the disclosure, if the SPS reconfiguration information is received from the base station 1602 without indicating separate PCell SPS release in the case of shifting the SPS configuration to the SCell during the SPS operation in the PCell, the terminal 1601 may release the SPS of the PCell being used. The SPS information that should be released by the terminal can be known through the SPS index of the SPS reconfiguration, and if the SPS index being operated in the SCell is equal to the SPS index being operated in the PCell in accordance with the SPS reconfiguration information, the SPS being used in the PCell is released. The terminal 1601 can confirm the SPS index to be configured in the SCell through the SPS reconfiguration information, and it can be aware of whether the SPS of the corresponding SPS index is being activated. If it is determined that the SPS of the PCell being used by the terminal 1601 is deactivated, the SPS release operation in the PCell is not performed.

If the SPS is configured with respect to the SCell, the base station 1602 may indicate CA activation of a carrier intended to be activated in the case where the SCell has not yet been activated through a MAC control element (CE) (S1680), and after the indication of the CA activation for the SCell, the base station may indicate the SPS activation configured in the SCell using the SPS index included in downlink control information (DCI) (S1690).

In an embodiment of the disclosure, one SPS index number may be uniquely operated for each PCell and SCell. For example, different SPS configurations can be expressed as SPS indexes 0 to 7 (e.g., 000 to 111), and SPS configuration Nos. 1 and 2 are configured (e.g., only for services having high latency requirement) and SPS configuration The carrierIndex-r15 includes a PCell Index and a SCell Index configured to the terminal. The PCell Index may be configured as "0", and the SCell index may be configured as a value that is not "0".

Thereafter, using the DCI (e.g., DCI format 5A), the base station may set the SPS index to "001", and it may set the SPS activation to "1" to indicate them to the terminal. If the DCI format 5A is indicated, the terminal can be aware that the SPS should be activated in the PCell through mapping of the SPS index 001 and the carrier index configured to the SPS reconfiguration information. After receiving the DCI indication, the terminal can activate the SPS having the SPS period of 100 ms in the PCell.

Another embodiment of the SPS reconfiguration information is as follows.

```
SPS-ConfigSL-r15 ::=   SEQUENCE {
    caxrierIndex-r25          carrierIndex-r15 optional,
    sps-ConfigIndex-r14       SPS-ConfigIndex-r24,
    semiPersistSchedIntervalSL-r14   ENUMERATED {
                               sf20, sf50, sf100, sf200, sf300, sf400,
                               sf500, sf600, sf700, sf800, sf900, sf1000,
                               spare4, spare3, spare2, spare1}
}
```

The carrierIndex-r15 includes SCell index configured to the terminal. The carrier index for SCell 1 may be configured to "1", and the carrier index for SCell 7 may be configured to "7". In the case where sps-ConfigIndex-r14 and semiPersistSchedIntervalSL-r14 are configured without the carrierIndex-r15 parameter, the terminal can recognize that the SPS configuration is applied to the PCell.

Further, the above-described carrierIndex-r15 may be defined as the following example.

CarrierIndex-*r*15::=INTEGER(1.7)

Here, CarrierIndex may be an index indicating the carrier of the PCell or an index indicating the carrier of the SCell. For example, if CarrieIndex is "1", it may indicate the PCell, whereas if CarrierIndex is "2", it may indicate SCell No. 1. Further, CarrierIndex is expressed as Integer (1~7) as an example, but if there are more carriers, it may not limited to "7". Further, it may be expressed as bit or ENUM instead of an integer.

Figure 17:
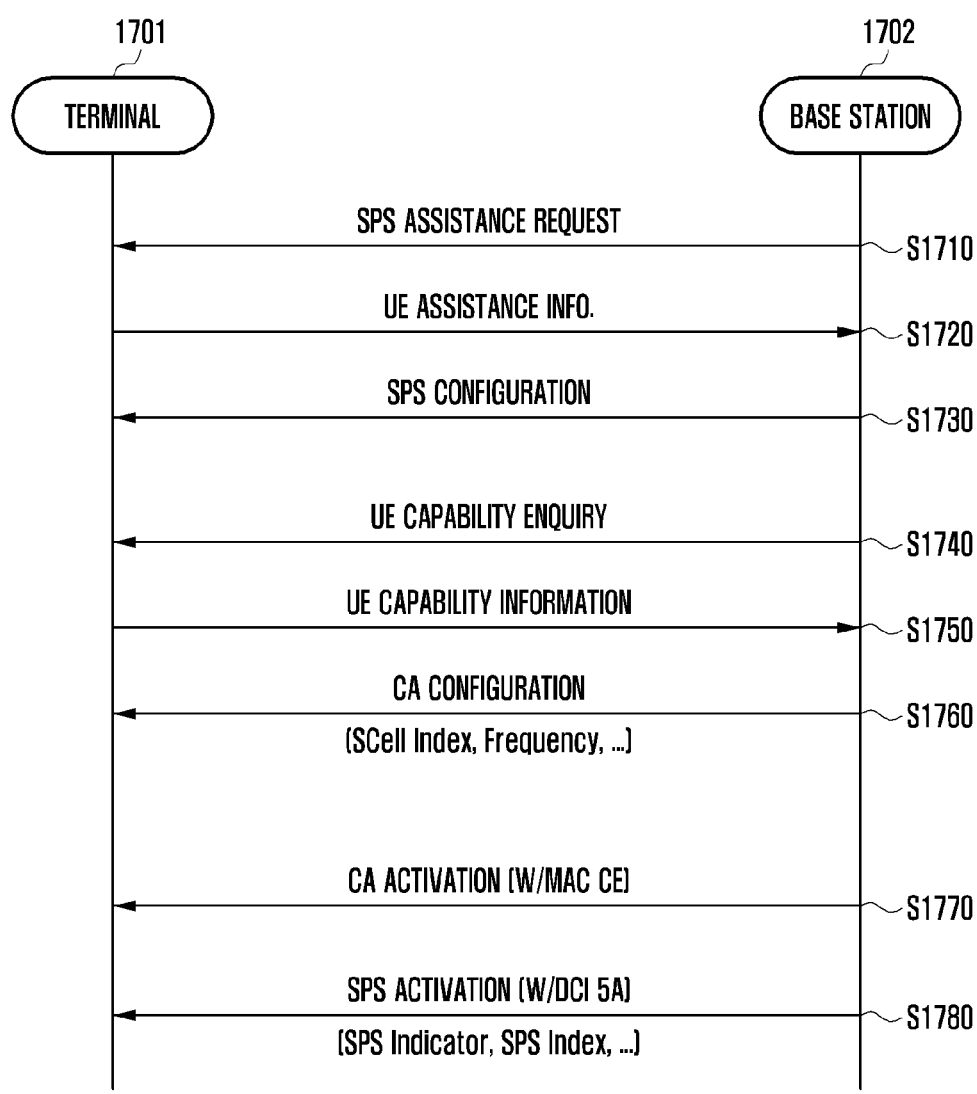
FIG. 17 is a diagram illustrating operations of a terminal and a base station in the case where the terminal and the base station independently use sidelink SPS configuration and sidelink CA configuration in a method proposed in the disclosure.

FIG. 17 is a diagram illustrating operations of a terminal and a base station in the case where the terminal and the base station independently use sidelink SPS configuration and sidelink CA configuration in a method proposed in the disclosure.

With reference to FIG. 17, a base station 1702 (e.g., eNB) may request data traffic information being serviced by a terminal 1701 by transmitting an SPS assistance request to the terminal 1701 to configure the SPS (S1710). The SPS assistance request message may be transmitted by a RRC message or system information.

If the SSPS assistance request is received, the terminal 1701 may transmit UE assistance information including data traffic information being serviced by the terminal 1701 to the base station 1702 (S1720). For example, the data traffic size and transmission period may be included as the data traffic information. The UE assistance message may be transmitted by the RRC message.

After receiving the UE assistance information from the terminal 1701, the base station 1702 may be aware of the characteristics of the data traffic being serviced by the terminal 1701. The base station 1702 may transmit one or more SPS configurations to the terminal 1701 to match the service using the traffic characteristics (S1730). For example, if the data transmission period among the traffic configurations is 100 ms, the base station 1702 may configure the SPS interval to 100 ms to transmit the SPS interval to the terminal 1701. In the above-described embodiment, it may be assumed that the SPS configuration has been made, but the SPS has not yet been activated.

Before the SPS between the base station 1702 and the terminal 1701 is activated, the base station 1702 may request the terminal 1701 to confirm whether the terminal can support the carrier aggregation through UE capability enquiry (S1740). In the above-described embodiment, although it is illustrated that the UE capability enquiry, UE capability information, and carrier aggregation configuration transactions are performed after the SPS configuration, it is also possible to perform the transactions before the SPS configuration.

After receiving the UE capability enquiry, the terminal 1701 may transmit usable carrier information (e.g., RF parameter or the like) to the base station 1702 as the UE capability information (S1750). After receiving the UE capability information, the base station 1702 transmits the carrier aggregation (CA) configuration information using the carrier information that can be supported by the UE (S1760). For example, SCell index, frequency, PhysicalCellID, SCell deactivation timer, and the like may be included in the CA configuration information. The carrier aggregation configuration may be transmitted as the RRC message.

The base station 1702 may indicate CA activation of the SCell intended to be activated through a MAC control element (CE) (S1770), and after the indication of the CA activation, the base station may indicate the SPS activation configured through the SPS index included in downlink control information (DCI) and the carrier information (e.g., SCell index) to be used (S1780). In an embodiment of the disclosure, if it is intended to activate the SPS of the PCell, the base station 1702 may indicate the PCell through carrier indicator information of DCI format 5A. For example, in the case of indicating the carrier indicator of the DCI format 5A as 000, the PCell may be indicated.

Further, the SPS configuration of the interval of 100 ms period may be indicated as SPS index 001. For example, in the LTE system, the SPS index can be expressed by ConfigIndex-r14.

```
SPS-ConfigSL-r14 ::=    SEQUENCE {
    sps-ConfigIndex-r14          SPS-ConfigIndex-r14,
    semiPersistSchedIntervalSL-r24  ENUMERATED {
                                 sf20, sf50, sf100, sf200, sf300, sf400,
                                 sf500, sf600, sf700, sf800, sf900, sf1000,
                                 spare4, spare3, spare2, spare1}
}
```

For example, the base station may indicate the SPS activation of the period of 100 ms in the PCell to the terminal by setting the DCI carrier indicator to 000, setting the SPS index to 001, and setting the SPS activation to 1. If the corresponding DCI is received, the terminal may activate the SPS of the period of 100 ms in the PCell.

In another embodiment of the disclosure, if it is intended to activate the SPS of the SCell, the base station may indicate the SCell using the carrier indicator information of the DBI format 5A. For example, in the DCI carrier indicator, 001 to 111 may indicate SCell Nos. 1 to 7. For example, in the LTE system, the SCell index may be mapped on the DCI carrier indicator. In the LTE system, the SCell index can be expressed as sCellIndex-r10 of SCellToAddMod-r10.

```
SCellToAddMod-r10 ::=    SEQUENCE {
    sCellIndex-r10              SCellIndex-r10,
    cellIdentification-r10      SEQUENCE {
        physCellId-r10              PhysCellId,
        dl-CarrierFreq-r10          ARFCN-ValueEUTRA
}
```

Further, through the above-described SPS index configuration method, the SPS configuration of the interval of the period of 1000 ms may be indicated as SPS index 111.

For example, the base station may indicate the SPS activation of the period of 1000 ms in the SCell to the terminal by setting the carrier indicator to 001, setting the SPS index to 111, and setting the SPS activation to 1 using an example of the DCI of FIG. 17. If the corresponding DCI is received, the terminal may activate the SPS of the period of 1000 ms in SCell No. 1.

Figure 18:
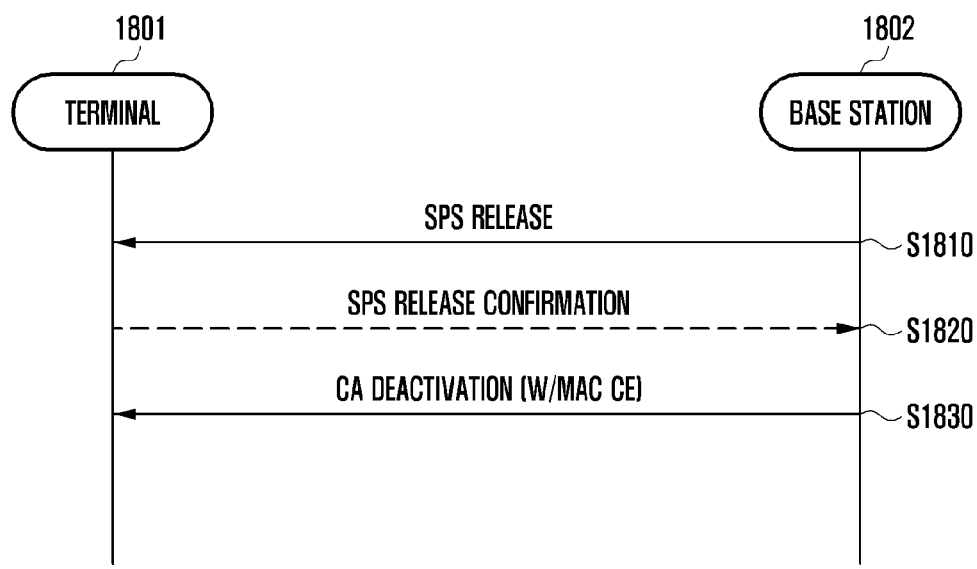
FIG. 18 is a diagram illustrating an operation method by a base station in the case where the base station deactivates a sidelink SCell while operating SPS on a sidelink SCell in a method proposed in the disclosure.

FIG. 18 is a diagram illustrating an operation method by a base station in the case where the base station deactivates a sidelink SCell while operating SPS on a sidelink SCell in a method proposed in the disclosure.

In an embodiment of the disclosure, a base station 1802 first indicates SPS release to a terminal 1801 using DCI in order to deactivate the SCell (S1810). For example, In the DCI carrier indicator, 001 may indicate the SCell being used, and the base station 1802 may indicate the SPS release of SCell 001 to the terminal 1801 by setting the DCI carrier indicator to 001 using DCI 5A, setting the SPS index to 001, and setting the SPS activation to "0". If the corresponding DCI is received, the terminal 1801 may deactivate the SPS of SPS index 1 in SCell 001.

If the SPS release indication is received, the terminal 1801 transmit SPS release confirmation to the base station 1802 through the MAC CE (S1820). After receiving the SPS release confirmation from the terminal 1801, the base station 1802 transmits a CA deactivation message (S1830). After receiving the CA deactivation message, the terminal 1802 deactivates the corresponding SCell 001.

In another embodiment of the disclosure, the base station first indicates the SPS release to the terminal using the DCI in order to deactivate the CA. After the SPS release indication, the base station transmits a CA deactivation message after a predetermined time (e.g., after N subframes). After receiving the CA deactivation message, the terminal deactivates the corresponding SCell.

In still another embodiment of the disclosure, the base station first indicates the SPS release to the terminal using the DCI in order to deactivate the CA. After the SPS release indication, the base station operates SPS-CA deactivation timer, and if the timer expires, the base station transmits the CA deactivation message. After receiving the CA deactivation message, the terminal deactivates the corresponding SCell.

After the SCell deactivation operation, the terminal performs the following operations.
  not transmit the sounding reference signal (SRS) on the SCell;
  not report channel quality information (CQI)/precoding matrix indicator (PMI)/rank indicator (RI)/precoding type indicator (PTI)/CSI-RS resource indicator (CRI) for the SCell;
  not transmit on UL-SCH on the SCell;
  not transmit on a random access channel (RACH) on the SCell;
  not monitor the physical downlink control channel (PDCCH) on the SCell;
  not transmit a physical uplink control channel (PUCCH) on the SCell.

Figure 19:
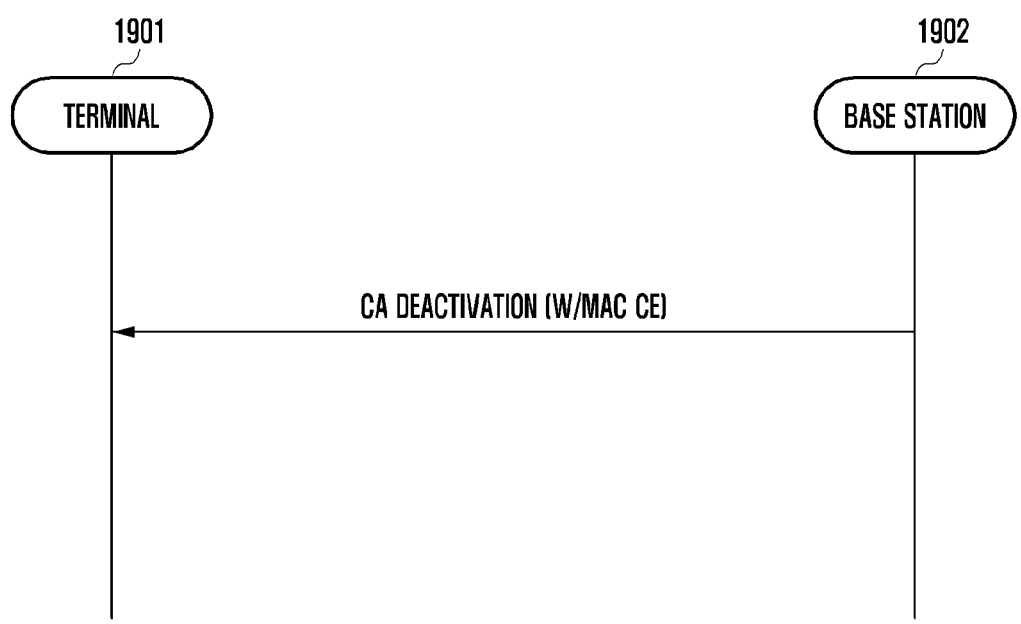
FIG. 19 is a diagram illustrating another embodiment of an SPS operation method in the case of deactivating a sidelink SCell during activation of the SPS on the sidelink SCell.

FIG. 19 is a diagram illustrating another embodiment of an SPS operation method in the case of deactivating a sidelink SCell during activation of the SPS on the sidelink SCell.

According to an embodiment of FIG. 19, if SPS is operated on SCell that is scheduled to be activated, the CA deactivation message may be used for the purpose of indicating CA deactivation of the SCell and SPS release.

In an embodiment of the disclosure, a terminal 1901 and a base station 1902 are using the SPS on the SCell. The base station may transmit a CA deactivation message using MAC CE for the SCell deactivation. An example of a MAC CE structure of the CA deactivation is as follows, and C1 to C7 denote SCells.

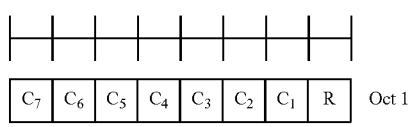

If the CA deactivation message is received from the base station 1902 during the SPS usage on the SCell, the terminal 1901 deactivates the SCell after releasing all the SPSs of the SCell. For example, if C1 of the CA deactivation message is set to "0", it indicates deactivation indication of SCell No. 1, and after receiving the corresponding message, the terminal 1901 releases all the activated SPS of SCell No. 1, and then it deactivates the SCell.

After the SCell deactivation operation, the terminal performs the following operations.
  not transmit SRS on the SCell;
  not report CQI/PMI/RI/PTI/CRI for the SCell;
  not transmit on UL-SCH on the SCell;
  not transmit on RACH on the SCell;
  not monitor the PDCCH on the SCell;
  not transmit PUCCH on the SCell.

Figure 20:
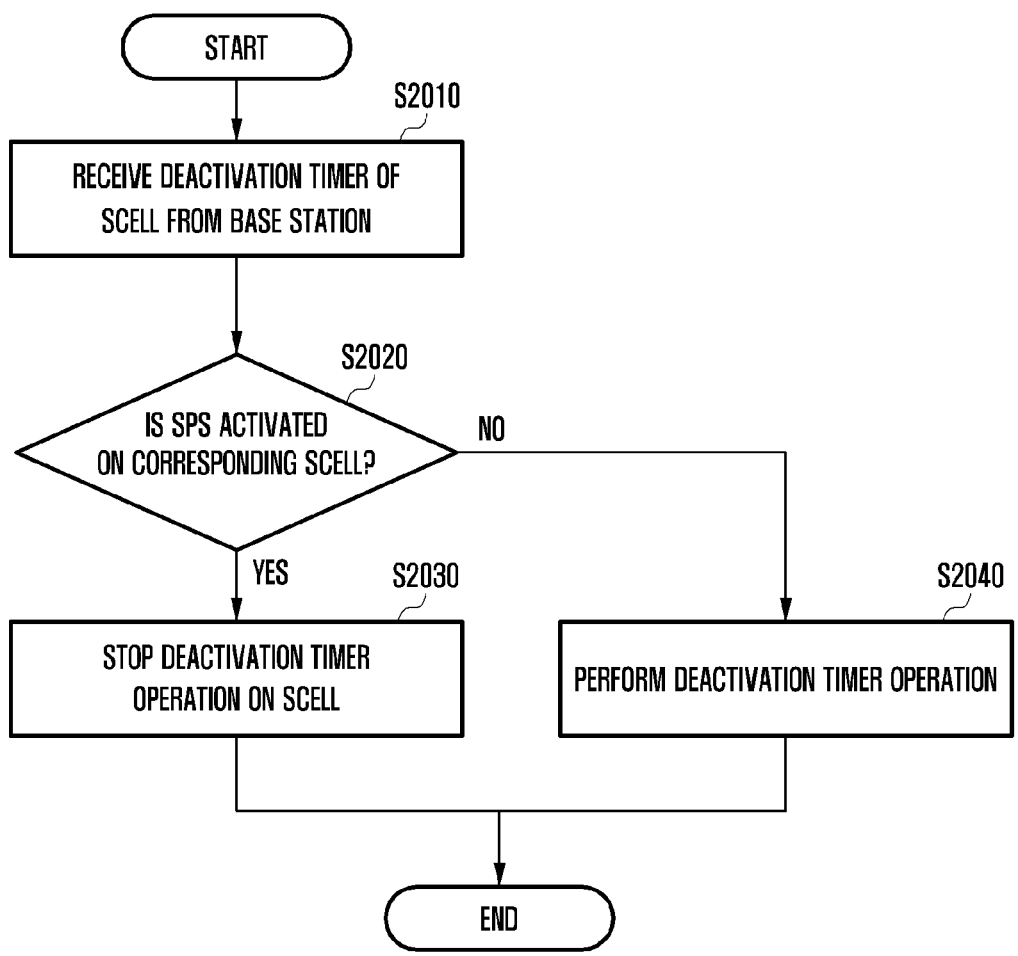
FIG. 20 is a diagram illustrating a method by a terminal for operating a deactivation timer in the case where SPS is configured on a sidelink SCell proposed in the disclosure.

FIG. 20 is a diagram illustrating a method by a terminal for operating a deactivation timer in the case where SPS is configured on a sidelink SCell proposed in the disclosure.

In the case of activating SCell, a SCell deactivation timer serves to maintain the activation by what time. If the deactivation timer expires, the terminal may deactivate the SCell by itself. For example, if data (UL/DL) continuously exists on the SCell, the SCell deactivation timer restarts continuously without expiring. If data (UL/DL) does not exist, the timer does not restart, but expires. If the timer expires, the SCell is deactivated. The SCell deactivation timer may exist for each SCell.

The terminal may receive the deactivation timer of the SCell from the base station (S2010). After receiving the SCell deactivation timer, the terminal may start the timer.

After operating the SCell deactivation timer, the terminal may receive SPS configuration and SPS activation indication for the corresponding SCell. The terminal confirms whether the SPS has been activated on the corresponding SCell (S2020).

For example, if the terminal receives the SPS activation indication, it stops the operation of the deactivation timer of the SCell (S2030). In contrast with this, if the terminal has received the SPS configuration, but has not received the SPS activation indication, the terminal performs the deactivation timer operation of the SCell (S2040).

Figure 21:
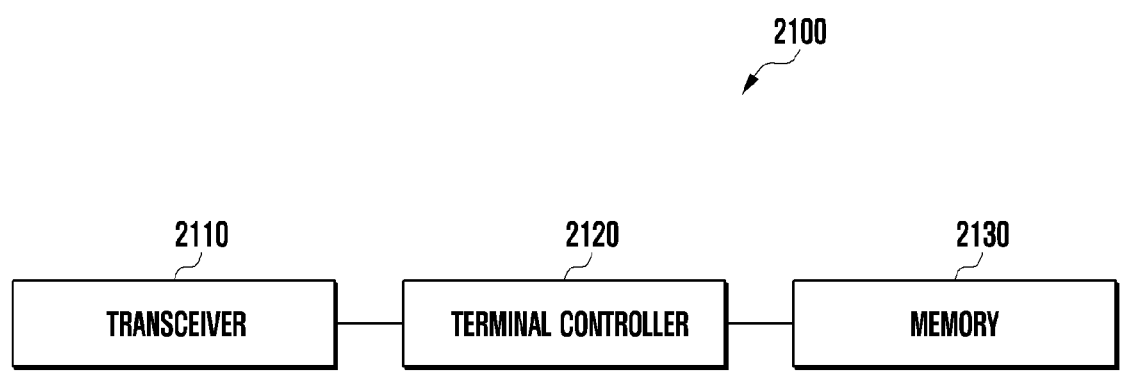
FIG. 21 is a diagram illustrating the structure of a terminal according to an embodiment of the disclosure.

FIG. 21 is a diagram illustrating the structure of a terminal according to an embodiment of the disclosure.

With reference to FIG. 21, a terminal 2100 may include a transceiver 2110, a terminal controller 2120, and a memory 2130. In the disclosure, the terminal controller 2120 may be defined as a circuit or application-specific integrated circuit or at least one processor.

The transceiver 2110 may transmit and receive a signal to and from another network entity. For example, the transceiver 2110 may receive system information from a base station, and it may receive a synchronization signal or a reference signal.

The terminal controller 2120 may control the overall operation of the terminal according an embodiment proposed in the disclosure. For example, the terminal controller 2120 may control a signal flow between respective blocks to perform an operation according to the above-described drawings and flowcharts.

The memory 2130 may store at least one of information transmitted and received through the transceiver 2110 and information generated through the terminal controller 2120.

Figure 22:
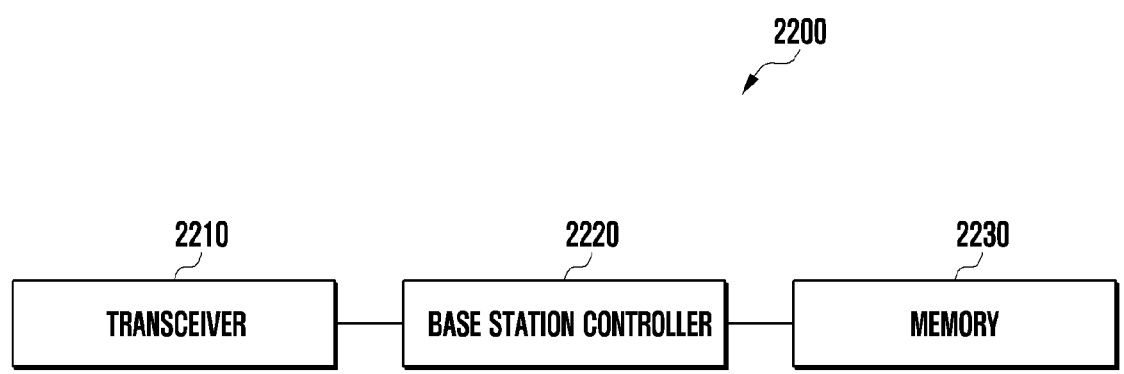
FIG. 22 is a diagram illustrating the structure of a base station according to an embodiment of the disclosure.

FIG. 22 is a diagram illustrating the structure of a base station according to an embodiment of the disclosure.

With reference to FIG. 22, a base station 2200 may include a transceiver 2210, a base station controller 2220, and a memory 2230. In the disclosure, the base station controller may be defined as a circuit or application-specific integrated circuit or at least one processor.

The transceiver 2210 may transmit and receive a signal to and from another network entity. For example, the transceiver 2210 may transmit system information to a terminal, and it may transmit a synchronization signal or a reference signal.

The base station controller 2220 may control the overall operation of the base station according an embodiment proposed in the disclosure. For example, the base station controller 2220 may control a signal flow between respective blocks to perform an operation according to the above-described drawings and flowcharts.

The memory 2230 may store at least one of information transmitted and received through the transceiver 2210 and information generated through the base station controller 2220.

As described above, embodiments disclosed in the specification and drawings are merely used to present specific examples to easily explain the contents of the disclosure and to help understanding, but are not intended to limit the scope of the disclosure. Accordingly, the scope of the disclosure should be interpreted to include all changes or modifications derived based on the technical concept of the disclosure in addition to the embodiments disclosed herein.

The invention claimed is:

1. A method performed by a base station in a wireless communication system, the method comprising:
   receiving, from a terminal, a first message including assistance information for a sidelink communication, the assistance information including information on a traffic pattern;
   transmitting, to the terminal, a semi-persistent scheduling (SPS) transmission for a first SPS configuration on a primary cell (PCell), the first SPS configuration being configured for the PCell based on the information on the traffic pattern;
   transmitting, to the terminal, a second message including first information on an index of a secondary cell (SCell) configured for the terminal and second information on the first SPS configuration, wherein the SCell is determined based on the information on the traffic pattern, and the first SPS configuration is configured for the SCell based on the second information; and
   transmitting, to the terminal, the SPS transmission for the first SPS configuration on the SCell, wherein the first SPS configuration for the PCell is released based on a transmission of the second message, and
   wherein the SPS transmission for the first SPS configuration is activated based on control information including an SPS index corresponding to the first SPS configuration.

2. The method of claim 1, wherein the second information is mapped to the first information in the second message.

3. The method of claim 1,
   wherein the first message and the second message are transmitted by a radio resource control (RRC) signaling,
   wherein the control information for activating the SPS transmission is transmitted by downlink control information (DCI), and
   wherein the information on the traffic pattern includes information on a traffic periodicity.

4. A method performed by a terminal in a wireless communication system, the method comprising:
   transmitting, to a base station, a first message including assistance information for a sidelink communication, the assistance information including information on a traffic pattern;
   receiving, from the base station, a semi-persistent scheduling (SPS) transmission for a first SPS configuration on a primary cell (PCell), the first SPS configuration being configured for the PCell based on the information on the traffic pattern;
   receiving, from the base station, a second message including first information on an index of a secondary cell (SCell) configured for the terminal and second information on the first SPS configuration, wherein the SCell is determined based on the information on the traffic pattern, and the first SPS configuration is configured for the SCell based on the second information; and
   receiving, from the base station, the SPS transmission for the first SPS configuration on the SCell, wherein the first SPS configuration for the PCell is released based on a transmission of the second message, and
   wherein the SPS transmission for the first SPS configuration is activated based on control information including an SPS index corresponding to the first SPS configuration.

5. The method of claim 4, wherein the second information is mapped to the first information in the second message.

6. The method of claim 4,
   wherein the first message and the second message are transmitted by a radio resource control (RRC) signaling,
   wherein the control information for activating the SPS transmission is transmitted by downlink control information (DCI), and
   wherein the information on the traffic pattern includes information on a traffic periodicity.

7. A base station in a wireless communication system, the base station comprising:
   a transceiver; and
   a controller configured to:
   control the transceiver to receive, from a terminal, a first message including assistance information for a sidelink communication, the assistance information including information on a traffic pattern,
   control the transceiver to transmit, to the terminal, a semi-persistent scheduling (SPS) transmission for a first SPS configuration on a primary cell (PCell), the first SPS configuration being configured for the PCell based on the information on the traffic pattern,
   control the transceiver to transmit, to the terminal, a second message including first information on an index of a secondary cell (SCell) configured for the terminal and second information on the first SPS configuration, wherein the SCell is determined based on the information on the traffic pattern, and the first SPS configuration is configured for the SCell based on the second information, and
   control the transceiver to transmit, to the terminal, the SPS transmission for the first SPS configuration on the SCell,
   wherein the first SPS configuration for the PCell is released based on a transmission of the second message, and
   wherein the SPS transmission for the first SPS configuration is activated based on control information including an SPS index corresponding to the first SPS configuration.

8. The base station of claim 7, wherein the second information is mapped to the first information in the second message, wherein the first message and the second message are transmitted by a radio resource control (RRC) signaling, wherein the control information for activating the SPS transmission is transmitted by downlink control information (DCI), and wherein the information on the traffic pattern includes information on a traffic periodicity.

9. A terminal in a wireless communication system, the terminal comprising:
a transceiver; and
a controller configured to:
control the transceiver to transmit, to a base station, a first message including assistance information for a sidelink communication, the assistance information including information on a traffic pattern,
control the transceiver to receive, from the base station, a semi-persistent scheduling (SPS) transmission for a first SPS configuration on a primary cell (PCell), the first SPS configuration being configured for the PCell based on the information on the traffic pattern,
control the transceiver to receive, from the base station, a second message including first information on an index of a secondary cell (SCell) configured for the terminal and second information on the first SPS configuration,
wherein the SCell is determined based on the information on the traffic pattern, and the first SPS configuration is configured for the SCell based on the second information, and
control the transceiver to receive, from the base station, the SPS transmission for the first SPS configuration on the SCell,
wherein the first SPS configuration for the PCell is released based on a transmission of the second message, and
wherein the SPS transmission for the first SPS configuration is activated based on control information including an SPS index corresponding to the first SPS configuration.

10. The terminal of claim 9, wherein the second information is mapped to the first information in the second message.

11. The terminal of claim 9,
wherein the first message and the second message are transmitted by a radio resource control (RRC) signaling,
wherein the control information for activating the SPS transmission is transmitted by downlink control information (DCI), and
wherein the information on the traffic pattern includes information on a traffic periodicity.

* * * * *